(12) United States Patent
Williams et al.

(10) Patent No.: US 11,175,214 B2
(45) Date of Patent: Nov. 16, 2021

(54) CYCLIC FLEXING ENVIRONMENTAL CHAMBER AND METHODS

(71) Applicant: THE BOEING COMPANY, Chicago, IL (US)

(72) Inventors: Kristen Smith Williams, Madison, AL (US); Bruno Zamorano Senderos, Huntsville, AL (US); David Adam Jackson, Madison, AL (US)

(73) Assignee: THE BOEING COMPANY, Chicago, IL (US)

( * ) Notice: Subject to any disclaimer, the term of this patent is extended or adjusted under 35 U.S.C. 154(b) by 158 days.

(21) Appl. No.: 16/223,285

(22) Filed: Dec. 18, 2018

(65) Prior Publication Data

US 2020/0191702 A1   Jun. 18, 2020

(51) Int. Cl.
*G01N 17/00* (2006.01)

(52) U.S. Cl.
CPC ......... *G01N 17/002* (2013.01); *G01N 17/006* (2013.01)

(58) Field of Classification Search
CPC ...... G01N 3/20; G01N 17/002; G01N 17/006; G01N 19/00; G01N 2203/022; G01N 2203/0222; G01M 5/0016; G01M 5/0041; G01M 5/005
USPC .......................... 73/788, 812, 826, 833, 865.6
See application file for complete search history.

(56) References Cited

U.S. PATENT DOCUMENTS

| | | | |
|---|---|---|---|
| 4,698,507 A | 10/1987 | Tator et al. | |
| 10,012,581 B2 | 7/2018 | Pennell et al. | |
| 2013/0109099 A1 | 5/2013 | Bridenbaker | |
| 2017/0059472 A1* | 3/2017 | Pennell | G01N 3/32 |
| 2018/0143126 A1 | 5/2018 | Williams et al. | |
| 2018/0313745 A1 | 11/2018 | Pennell et al. | |

FOREIGN PATENT DOCUMENTS

GB      2556697 A      6/2018

OTHER PUBLICATIONS

Extended European Search Report for Application No. 19203778.6-1001 dated Mar. 4, 2020.
(Continued)

*Primary Examiner* — Benjamin R Schmitt
(74) *Attorney, Agent, or Firm* — Patterson + Sheridan, LLP

(57) ABSTRACT

In one aspect, an apparatus includes a chamber configured to control one or more of humidity, pressure, or temperature and a jaw configured to flex a material system. The chamber includes an enclosure disposed within the chamber, the enclosure having an insulating material, and a motor or an actuator disposed within the enclosure. The chamber includes an inlet tube coupled with the enclosure at a first end and a first wall of the chamber at a second end. In one aspect, a method for determining material performance includes exposing a material system to a relative humidity of from 0% to 98% and flexing the material system at a first temperature in a chamber, the chamber comprising an enclosure disposed within the chamber and a motor disposed within the enclosure. The method includes operating the motor at a second temperature different from the first temperature during the flexing.

24 Claims, 9 Drawing Sheets

(56) References Cited

OTHER PUBLICATIONS

Effect of Mechanical Stress and Environmental Conditions on Degradation of Aerospace Coatings that Guard against Atmospheric Corrosion, Presented at CORROSION 2018, Apr. 15-19, 2018, Phoenix, Arizona, USA. Paper #C2018-11177.
Combined Mechanical Stress and Environmental Exposure Accelerated Coating Testing. Presented at CORROSION 2017, Mar. 26-30, 2017, New Orleans, Louisiana, USA. Paper #C2017-9116.
Kristin S. Williams, et al., ASETSDefense 2018: Sustainable Surface Engineering for Aerospace and Defense Workshop, Denver, CO, Aug. 21-23, 2018.
Extended European Patent Examination Report for Application No. 19203778.6-1001 dated Jul. 21, 2021.

* cited by examiner

CYCLIC FLEXING ENVIRONMENTAL CHAMBER AND METHODS

GOVERNMENT SUPPORT

This invention was made with Government support under contract number W912HQ-15-C-0012 awarded by the Department of Defense. The government has certain rights in this invention.

FIELD

Aspects of the present disclosure generally relate to methods for determining operational performance of material systems.

BACKGROUND

Spanning the lifetime of operation, an aircraft will experience repeated and harsh conditions that may result in degradation of some of the component parts of the aircraft. Such degradation may take the form of, for example, coating failure and/or corrosion. Corrosion can contribute to a decrease in the integrity and strength of aircraft components. More specifically, a material system, such as an aircraft component, includes a fuselage or skin panels, a coated lap joint between two metal panels, or a wing-to-fuselage assembly on the exterior of an aircraft. Material systems may corrode over time due to exposure to mechanical and chemical stresses during use of the aircraft. Before a material is determined to be suitable for use as an aircraft material system, it may be desirable to determine the material system's propensity to corrode. However, performance of aircraft material systems, such as panels, during actual, real world use of the aircraft may not correlate with coating and/or corrosion testing data. For example, ground-air-ground (GAG) chambers are used to simulate conditions a material system will experience upon increasing/decreasing temperature, pressure, and humidity levels. However, these chambers cannot simulate very cold (e.g., deep freeze) conditions due to a decrease in performance of the motor or actuator of the chamber. This is particularly true at low temperature and high humidity conditions because in GAG chambers only ambient humidity can be achieved under deep freeze conditions without substantially decreasing the performance of the motor or actuator of the chamber and causing frost to form on the panel flexer itself. In addition, motor/actuator functionality is also decreased during high temperature (e.g., 70° C. or higher) operations.

Therefore, there is a need in the art for apparatus and methods for controlled and accurate exposure, as well as coating and corrosion detection for determining operational performance of material systems.

SUMMARY

In one aspect, an apparatus includes a chamber configured to control one or more of humidity, pressure, or temperature and a jaw configured to flex a material system. The chamber includes an enclosure disposed within the chamber, the enclosure having an insulating material, and a motor or actuator disposed within the enclosure. The chamber includes an inlet tube coupled with the enclosure at a first end and a first wall of the chamber at a second end. The chamber further includes an outlet tube coupled with the enclosure at a first end and the first wall or a second wall of the chamber at a second end.

In another aspect, a method for determining material performance includes exposing a material system to a relative humidity of from 0% to 98% and flexing the material system at a first temperature in a chamber, the chamber comprising an enclosure disposed within the chamber and a motor or actuator disposed within the enclosure. The method includes operating the motor or actuator at a second temperature different from the first temperature during the flexing.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

Figure 1:
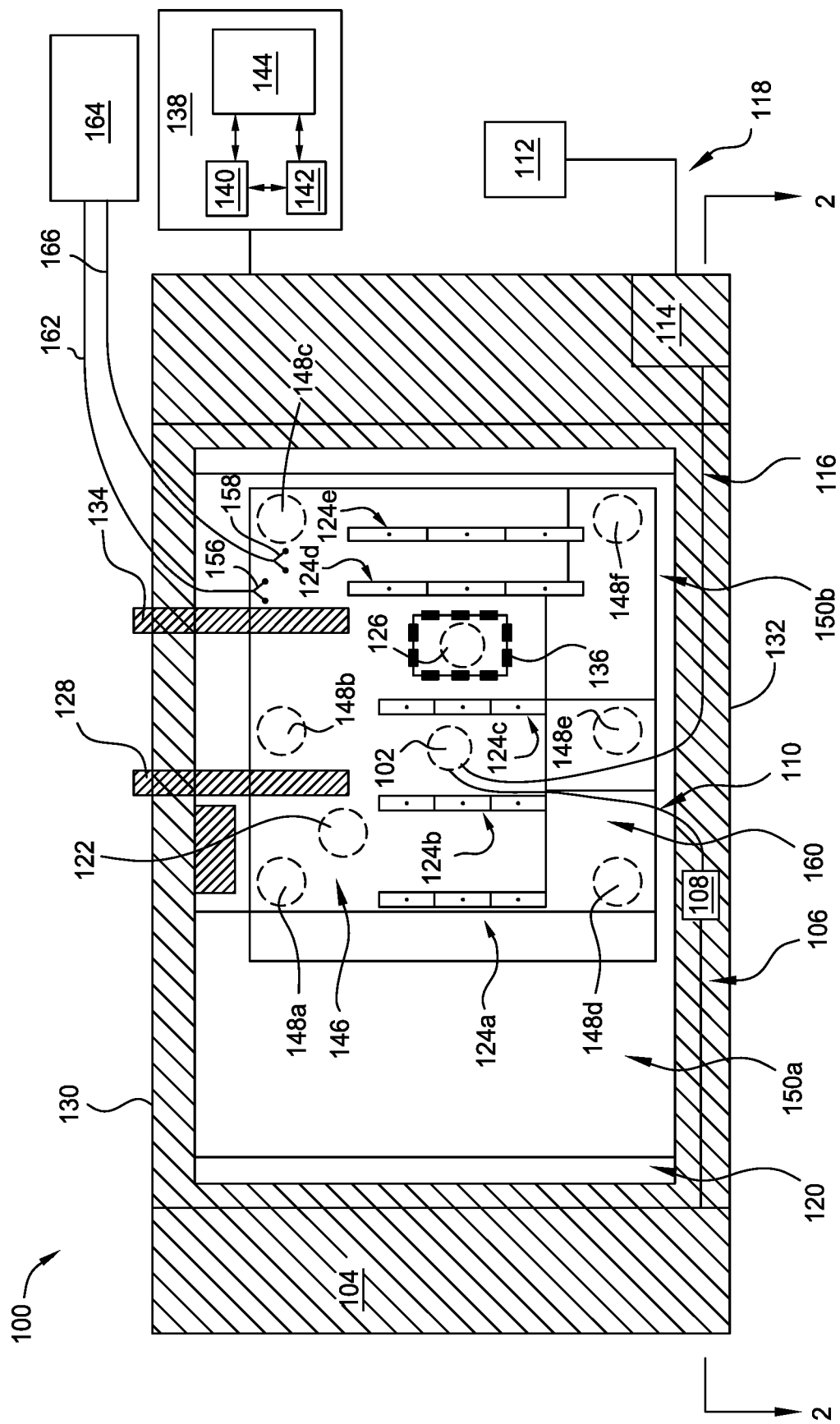
FIG. 1 is a top sectional view of an apparatus for accelerating and controlling the coating failure modes and/or corrosion-related failure modes of a material system, according to an aspect of the disclosure.

To facilitate understanding, identical reference numerals have been used, where possible, to designate identical elements that are common to the figures. The figures are not drawn to scale and may be simplified for clarity. It is contemplated that elements and features of one aspect may be beneficially incorporated in other aspects without further recitation.

DETAILED DESCRIPTION

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects of the present disclosure generally relate to apparatus and methods for determining operational performance of material systems. A material system can be a component of an aircraft and typically comprises a substrate, such as a metal, and one or more coatings, such as an epoxy, disposed on the substrate. One or more electrodes, such as a pair of electrodes, are disposed on or within a surface of the material system to provide electrochemical detection of operational performance, e.g. corrosion or coating impedance, of the material system. Determining operational performance of a material system can be performed in a lab setting or on an aircraft by an operator or manufacturer before, during (in situ), or after the material system has been exposed to flexing and/or moisture treatment. For example, a material system can be in electrical communication with a spectrometer to provide impedance data of one or more surfaces of the material system to assist in determination of the operational performance of the material system during flexing and moisture exposure of the material system.

In one aspect, an apparatus includes a chamber configured to control one or more environmental parameters such as humidity, pressure, or temperature. In at least one aspect, the chamber is configured to control humidity, pressure, and temperature. The apparatus further includes a jaw configured to flex a material system. The chamber includes an enclosure disposed within the chamber, the enclosure having an insulating material, and a motor or actuator disposed within the enclosure. A motor can be any suitable electric motor, gas powered motor, pneumatic motor or hydraulic motor. An actuator can be any suitable electric actuator, gas powered actuator, pneumatic actuator or hydraulic actuator. The chamber includes an inlet tube coupled with the enclosure at a first end and a first wall of the chamber at a second end. The chamber further includes an outlet tube coupled with the enclosure at a first end and the first wall or a second wall of the chamber at a second end. In another aspect, a method for determining material performance includes exposing a material system to a relative humidity of from 0% to 98% and optionally flexing the material system at a first temperature in a chamber, the chamber comprising an enclosure disposed within the chamber and a motor or actuator disposed within the enclosure. The method includes operating the motor or actuator at a second temperature different from the first temperature during the flexing.

Apparatus and methods of the present disclosure provide a controlled humidity environment suitable for deep freeze and high temperature conditions and monitoring of material performance, such as corrosion or coating impedance, on a variety of material systems, such as aircraft material systems, such as panels, coated lap joints between two or more panels, wing-to-fuselage assemblies, or combinations thereof. Material systems, apparatus and methods of the present disclosure provide an ability to replicate in-service, real-world failure modes and mechanisms in a controlled exposure environment, such as under deep freeze and high temperature conditions.

Mechanical flexing of a material system in an apparatus of the present disclosure may result in increased corrosion or reduced coating performance of a material system. The compounding effects of mechanical and chemical stresses combine to induce degradation that more accurately replicates corrosion and coating failures experienced by a material system, such as an aircraft panel, in a real-world environment. Accordingly, methods and apparatus of the present disclosure more accurately simulate the coating failures and corrosion observed with aircraft material systems during real-world use of the aircraft, such as under deep freeze and high temperature conditions. Material systems, methods and apparatus of the present disclosure allow for testing coating degradation and corrosion of stand-alone material systems and the interfaces between coating layers, which more accurately represents the degradation experienced by material systems, such as panels, during actual use of the material systems as part of an aircraft. Material systems, methods and apparatus of the present disclosure further provide re-creation of irregular flight-specific strain profiles so that improved predictive as well as forensic investigations of aircraft material systems may be performed.

Apparatus

A material system, such as a panel, may have one or more surface layers such as a surface finish, a primer, and/or a top coat. Corrosion and/or coating degradation may occur at one or more of these layers in use due to mechanical and chemical stresses. Material systems, apparatus, and methods of the present disclosure provide in situ electrochemical monitoring of impedance to determine corrosion and/or coating failure in a setting that mimics the degradation experienced by a material system in actual use conditions. The material system is subjected to mechanical as well as chemical stresses without degradation of the electrochemical monitoring system. Material systems, apparatus and methods of the present disclosure provide electrochemical monitoring of impedance to determine corrosion and/or coating failure at one or more of a material system surface, a finished surface, a primer surface, and/or a top coat surface.

Figure 2:
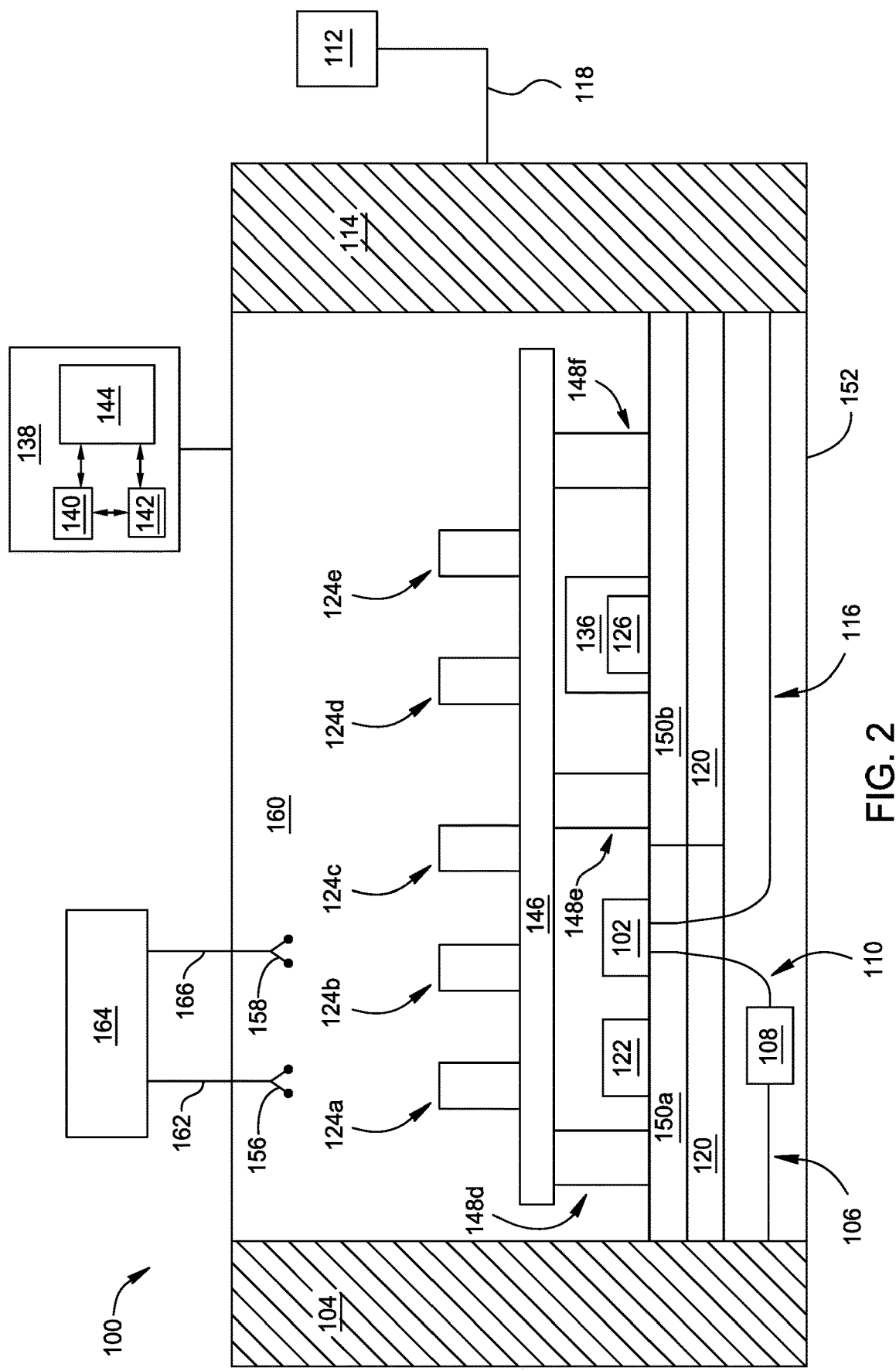
FIG. 2 is a side sectional view of an apparatus for accelerating and controlling the coating failure modes and/or corrosion-related failure modes of a material system, according to an aspect of the disclosure.
Figure 3:
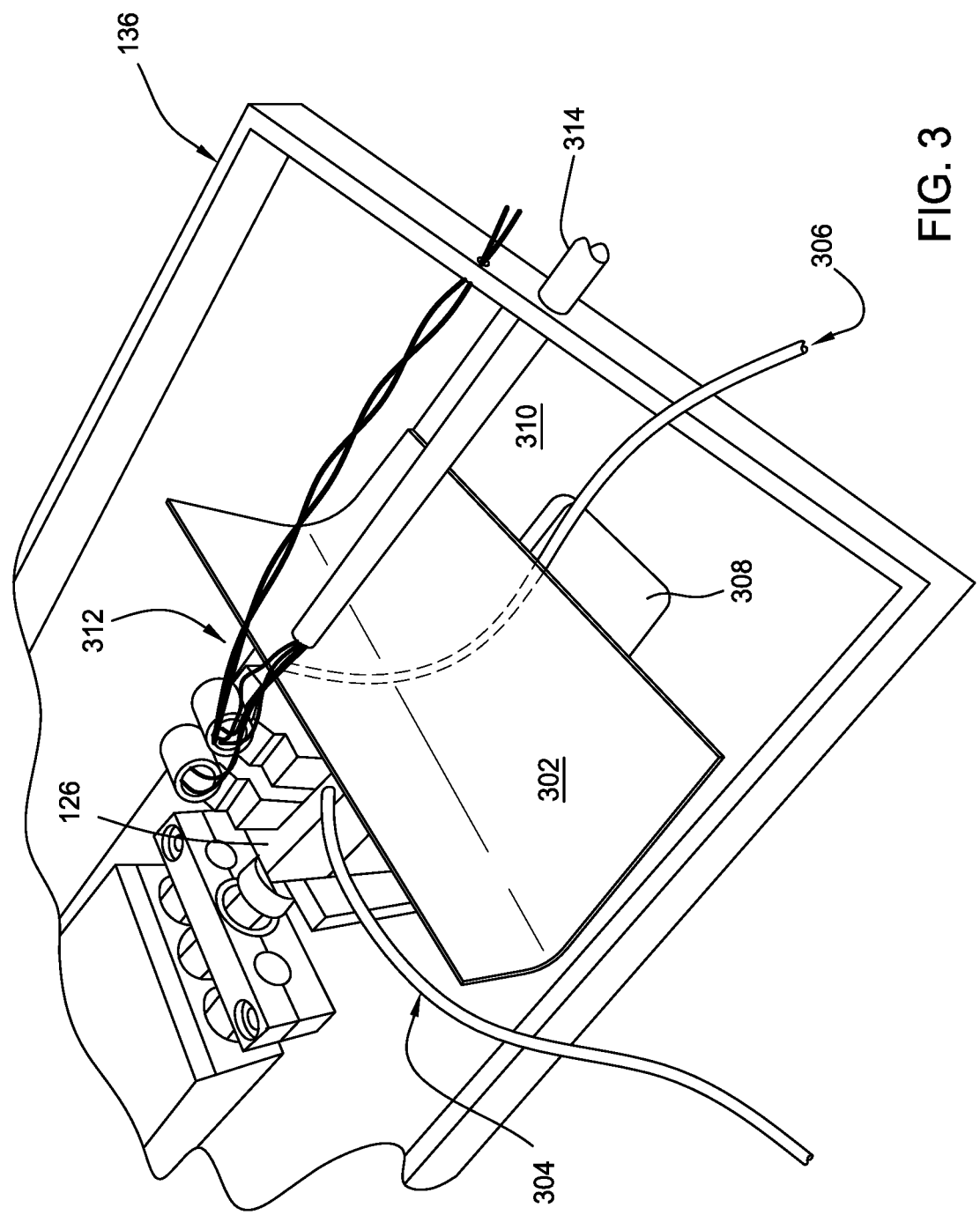
FIG. 3 is a perspective view of an enclosure, according to an aspect of the disclosure.

FIG. 1 is a plan view of an apparatus 100 for accelerating and controlling the coating-related failure modes and corrosion-related failure modes of a material system, according to an aspect of the disclosure. FIG. 2 is a side perspective view of apparatus 100 of FIG. 1. One or more components of apparatus 100 are made of materials that show resistance to a corrosive environment, such as an environment containing humidity, e.g. a salt fog. As shown in FIGS. 1 and 2, apparatus 100 includes an enclosure 160 (which is a chamber configured to control one or more of humidity, pressure, or temperature) having one or more fog nozzles 102 (one shown) disposed therein and configured to spray a treating fluid, such as a salt fog, in the chamber 160. One or more jaws are disposed in the enclosure to support a material system for exposure and flexing therein. Apparatus 100 includes a liquid reservoir 104 to supply a treating fluid to fog nozzle 102. Fog nozzle 102 may be a nozzle, such as an atomizing nozzle, a nozzle calibrated for air consumption, full cone nozzle (e.g., obtained from BETE Fog Nozzle, Inc. of Greenfield, Mass.), hollow cone nozzle, fan misting nozzle, tank washing spray nozzle, NASA Mod1 nozzle for water spray atomization and droplet control, Q-Lab Original Equipment Manufacturer (OEM) fogging nozzle, Cool Clean ChilAire Lite spray applicator nozzle, or combinations thereof. Fog nozzle 102 can be made of materials such as hard rubber, plastic, or other inert materials.

Jaws 124a-e are configured to flex a material system. Plate 146 is configured to support jaws 124a-e. In at least one aspect, plate 146 comprises a mounting plate disposed on a grate (such as a grate containing "I" shaped beams (known as an I-Beam grate)). Plate 146 is positioned between fog nozzle 102 and jaws 124a-124e (as shown in FIGS. 1 and 2), allowing treating fluid to enter the enclosure without directly impinging upon a material system held by one or more jaws 124a-e. This configuration mimics general humid atmospheric conditions, as compared to direct rainfall onto an aircraft material system. Alternatively, jaws 124a-e may be positioned between fog nozzle 102 and plate 146 (this configuration not shown), providing direct flow of treating fluid toward a material system held by one or more jaws 124a-e. This configuration mimics direct rain fall or aerosol deposition onto an aircraft material system. Fog nozzle 102 may be configured for flow angle adjustment, allowing flow of treating fluid at one or more angles relative to a material system surface. In at least one aspect, a material system surface may be parallel to a principal direction of flow of fluid through apparatus 100, based upon the dominant surface being tested, which reduces liquid collection on a material system during degradation testing performed in apparatus 100. In such aspects, fog nozzle 102 may be directed or baffled so that the liquid does not impinge directly on a material system. (Fog nozzle 102, a vent 122, a motor/actuator 126, an outer enclosure 136, and legs 148a-f are shown as dashed lines in FIG. 1 to indicate that these parts are located behind a plate 146 in the aspect shown in FIG. 1).

A fog pump 108 is configured to assist flow of a liquid from liquid reservoir 104 to fog nozzle 102 via first fluid line 106 and second fluid line 110. First fluid line 106 couples liquid reservoir 104 at a first end with fog pump 108 at a second end to provide liquid communication of liquid reservoir 104 with fog pump 108. Second fluid line 110 couples fog pump 108 at a first end with fog nozzle 102 at a second end to provide liquid communication of fog pump 108 with fog nozzle 102.

A compressed air source 112 and bubble tower 114 are configured to provide humidified air to fog nozzle 102. In at least one aspect, a pressure in the chamber may be regulated to mimic the pressure experienced by an aircraft at various altitudes during real world use. Accordingly, compressed air source 112 is configured to flow air to pressurize the chamber (in an exposure zone within the chamber) to a pressure of from about 0.1 PSI to about 200 PSI, such as from about 2 PSI to about 100 PSI, such as from about 15 PSI to about 60 PSI, such as about 20 PSI. In these ranges, lower pressure values mimic pressures experienced by an aircraft at higher altitudes while higher pressure values mimic pressures experienced by an aircraft at lower altitudes and closer to sea level. For example, a pressure of about 0.16 PSI represents an altitude of about 100,000 ft, and a pressure of about 14.7 PSI represents an altitude of about sea level (about 0 ft). A pressure of about 10.1 PSI to about 8.29 PSI represents an altitude of about 10,000 ft to about 15,000 ft which is a typical altitude for rotorcraft vehicles. In addition, a pressure of about 4.4 PSI in the chamber represents an altitude of about 30,000 ft which is a typical altitude for commercial airplanes.

Air may include a mixture of gases similar to that found in an ambient atmosphere, for example, comprising about 78% $N_2$, about 21% $O_2$, and about 0.039% $CO_2$, among other gases. Third fluid line 116 couples bubble tower 114 at a first end with fog nozzle 102 at a second end to provide air and liquid communication of bubble tower 114 with fog nozzle 102. A compressed air line 118 couples compressed air source 112 at a first end with bubble tower 114 at a second end to provide air communication of compressed air source 112 with bubble tower 114. Bubble tower 114 may contain a liquid, such as water, to provide initial humidification or additional humidification to air flowed from compressed air source 112 via compressed air line 118.

The vent 122 may extend through the first chamber wall 130, a second chamber wall 132, or a third wall 152 (FIG. 2) to provide pressure regulation inside of apparatus 100. A heater 120 may be provided and configured to regulate the temperature inside of apparatus 100 such as chamber configured to control one or more of humidity, pressure, or temperature 160. Heater 120 may be disposed adjacent to the first wall 130 of apparatus 100 and coupled with third wall 152 (FIG. 2). Heater 120 may be adhered to third wall 152 by any suitable adherent, such as rivets. Heater 120 may be coupled with and controlled by a controller 138.

Jaws 124a-e are configured to support and flex a material system positioned in the enclosure for testing. For example, jaws 124a, 124b, 124c, 124d, and 124e are configured to flex a material system, such as a panel, a coated lap joint between two metal panels, a wing-to-fuselage assembly, or combinations thereof. The material system may be an aircraft material system, such as a panel, such as a skin or fuselage flat panel. The material system may have a width that is, for example, about 4 inches, and a length that is for example, about 6 inches to about 14.5 inches. The one or more jaws may flex a material system to a strain ranging from about 0.05% to about 50%, about 0.1% to about 30%, about 0.3% to about 5%, such as about 0.37%.

Jaws 124a-e are configured to grip and release a material system. Jaws 124a-e are configured to flex a material system from a first starting position to a fully or partially flexed second position. Jaws 124a-e are configured to flex a material system from a first position to a second position that is from greater than 0° to about 180° from the starting position, such as about 5° to about 90°, such as about 5° to about 45°, during a flexing process. Jaws 124a-124e may be the same size or different sizes. For example, jaw 124a may be the same size as jaw 124b, but be a different size than jaw 124d (as shown in FIG. 1). Furthermore, jaws 124a-124e may be positioned from one another by a distance that is the same or different than a distance between a different pair of jaws 124a-e. For example, a first distance between jaw 124a and 124b may be different than a second distance between jaw 124d and 124e. Various jaw sizes and various distances between jaws provide, for example, simultaneous testing of different sized material systems, such as panels, during an exposing and flexing process within apparatus 100. In at least one aspect, one or more of jaws 124a-e comprises steel. In at least one aspect, one or more of jaws 124a-e is anodized. In at least one aspect, one or more of jaws 124a-e comprises an inert material such as hard rubber and/or plastic. One or more of jaws 124a-e can comprise an insulating material, such as a polyethylene (e.g., high density polyethylene (e.g., a density of 0.94 $g/cm^3$ or greater)) and/or fiberglass, to provide maintenance of the temperature of the jaws (and the material systems) independent of the temperature of the chamber motor or actuator. In such aspects, the temperature of jaws 124a-e can be maintained at a desired temperature while motor/actuator 126 is also maintained at a desirable temperature (e.g. by insulation of the enclosure, as described in more detail below).

As described in more detail below (FIG. 4), in at least one aspect, jaws 124a-e are configured to support a material system, such as a panel, from about 0° to about 30°, such as from about 15° to about 30°, relative to a first wall 130 and/or second wall 132, which reduces liquid collection on a material system during degradation testing performed in apparatus 100. In at least one aspect, jaw 124*a* is configured to grip a material system at a first end of the material system and jaw 124*b* is configured to grip the material system at a second end of the material system. In at least one aspect, jaws 124*a-e* are configured to flex a material system simultaneously or alternatively.

The motor/actuator 126 operates jaws 124*a-e*. Inlet tube 128 is coupled with enclosure 136 at a first end and coupled with first wall 130 at a second end for providing a gas, such as air, to motor/actuator 126. Outlet tube 134 is coupled with enclosure 136 at a first end and coupled with first wall 130 at a second end for removing hot air exhaust from motor/actuator 126. Outer enclosure 136 surrounds motor/actuator 126 to enclose and protect the motor/actuator from fluid emitted from fog nozzle 102 or any other fluid present inside of apparatus 100. Outer enclosure 136 can include one or more insulating materials, such as a polyethylene (e.g., high density polyethylene) and/or fiberglass. The insulating material(s) can be coupled with (directly or indirectly) one or more walls of outer enclosure 136 and/or with motor/actuator 126 disposed within outer enclosure 136. Insulating material(s) coupled with the wall(s) of an outer enclosure and/or motor/actuator provides for temperature of the motor/actuator to be maintained at a desirable temperature, particularly at low temperature conditions within the chamber outside of the outer enclosure. In addition, providing a gas, such as air, to the motor/actuator provides additional temperature control (warming or cooling) of the motor or actuator and other motor/actuator components (such as wires) and allows for convection to occur within the enclosure. For example, during a low temperature cyclic flexing process (e.g., at about −50° C. in the chamber (exposure zone)) or a high temperature cyclic flexing process (e.g., at about 50° C.), the gas provided to the enclosure 136 can have a temperature of from about −30° C. to about 50° C., such as about −10° C. to about 25° C., which can provide a temperature of the enclosure (e.g., the atmosphere in the enclosure) of from about −30° C. to about 50° C., such as about −10° C. to about 25° C. The gas provided to the enclosure 136 can have a relative humidity of from about 0% to about 90%, such as about 0% to about 50%, such as about 0.1% to about 10%, which can provide a relative humidity of the enclosure of from about 0% to about 90%, such as about 0% to about 50%, such as about 0.1% to about 10%. The gas is introduced into the enclosure so that the enclosure is pressurized to a pressure of from about 1 atmosphere to vacuum pressure (e.g., about 0.01 atmosphere). It has been discovered that these pressures can be realized in the enclosure to provide sufficient operability of the motor or actuator even at deep freeze or high temperature conditions present in the chamber.

Jaws 124*a-e* are supported by plate 146. Plate 146 is supported by legs 148*a*, 148*b*, 148*c*, 148*d*, 148*e*, and 148*f*. Legs 148*a-f* are coupled with plate 146 at a first end and a chamber wall, a rack 150*a*, or a rack 150*b* at a second end. Plate 146 can be disposed between the enclosure 136 and jaws 124*a-e*. Plate 146 can be made of an insulating material, such as a polyethylene (e.g., high density polyethylene) and/or fiberglass, to provide a temperature control barrier between motor or actuator 126 and jaws 124*a-e*. In such aspects, the temperature of jaws 124*a-e* can be maintained at a desired temperature while motor/actuator 126 is also maintained at a desirable temperature.

Additionally or alternatively, motor/actuator 126 translates bending motion inside the chamber via a screw, such as a ball screw, Acme screws, Lead screws, Roller screws, and screw mount, or an axle (not shown) coupled with jaws 124*a-e*. A screw maintains spacing between stationary block 406 and mobile block 404 during flexing, as described in more detail below. Hydraulic or pneumatic actuators or air driven motors can be used instead of an electric motor.

Apparatus and material systems of the present disclosure include one or more electrodes, such as one or more pairs of electrodes. An electrode may be coupled with a substrate (to form a material system) and subsequent use of apparatus 100 to test operational performance of the material system. During flexing, the center portion of the material system will experience more strain than the edges of the material system. Accordingly, a pair of electrodes disposed on the same side of the material system provides detecting impedance across the same side of the material system.

As shown in FIGS. 1 and 2, apparatus 100 includes electrode pairs 156 and 158. Although electrode pairs are shown in FIGS. 1 and 2, in an alternative aspect, apparatus 100 comprises single electrodes. Electrode pair 156 is configured to couple with a first side of a material system (not shown), and electrode pair 158 is configured to couple with a second side of the material system (not shown). Electrodes can be made of conductive epoxy, nickel, gold, silver, copper, platinum, palladium, or mixtures thereof. In at least one aspect, at least one electrode is conductive epoxy, such as the electrodes of pairs 156 and/or 158. In at least one aspect, conductive epoxy is conductive silver epoxy. Electrode pair 156 is coupled with spectrometer 164 via electrical line 162 to provide electrical communication between electrode pair 156 and spectrometer 164. Furthermore, electrode pair 158 is coupled with spectrometer 164 via electrical line 166 to provide electrical communication between electrode pair 156 and spectrometer 164. Electrical lines 162, 166 can be insulated wire (e.g., insulated steel wire) or wire having insulated conductive tape. Electrode pair 156 is configured to couple with a first side of a material system, and electrode pair 158 is configured to couple with a second side of the material system, as described in more detail below. In at least one aspect, spectrometer 164 comprises a potentiostat, galvanostat, and/or zero-resistance ammeter. Spectrometer 164 can be an electrochemical impedance spectrometer. When coupled with a material system, electrodes (e.g., electrode pairs 156 and 158) detect an electrical signal from the material system and transmit the electrical signal to a spectrometer, such as spectrometer 164. Spectrometer 164 is configured to interpret the electrical signal to provide electrical data, such as impedance, regarding the condition, such as coating failure and/or corrosion, of the material system. Electrochemical impedance is usually measured by applying an AC potential to an electrochemical cell and then measuring the current through the cell. The response to this potential, e.g. sinusoidal potential, is an AC current signal. This current signal can be analyzed as a sum of sinusoidal functions (a Fourier series). Electrochemical impedance is normally measured using a small excitation signal. This is done so that the cell's response is pseudo-linear. In a linear (or pseudo-linear) system, the current response to a sinusoidal potential will be a sinusoid at the same frequency but shifted in phase. Electrochemical impedance spectroscopy (EIS) data are typically analyzed in terms of an equivalent circuit model. Echem Analyst [a Gamry software product] finds a model whose impedance matches the measured data.

Parts of apparatus 100 described herein may comprise materials that are suitably inert to conditions within apparatus 100 during a cyclic flexing fog spray process. Suitably inert materials may include a polyethylene (e.g., high density polyethylene), fiberglass, plastic, glass, stone, metal, rubber, and/or epoxy. Other materials that may be used to fabricate parts of one or more parts of apparatus 100 include high density polypropylene, commercial grade Titanium (II) with polyethylene insert, stainless steel with polyethylene insert, and combinations thereof.

Apparatus 100 may be controlled by a processor based system controller such as controller 138. For example, the controller 138 may be configured to control apparatus 100 parts and processing parameters associated with control of one or more of flexing, humidity, pressure, or temperature. The controller 138 includes a programmable central processing unit (CPU) 140 that is operable with a memory 142 and a mass storage device, an input control unit, and a display unit (not shown), such as power supplies, clocks, cache, input/output (I/O) circuits, and the like, coupled to the various components of the apparatus 100 to facilitate control of a cyclic flexing fog spray process. Controller 138 may be in electronic communication with, for example, inlet tube 128, outlet tube 134, vent 122, heater 120, and/or jaws 124*a-e*.

Figure 4:
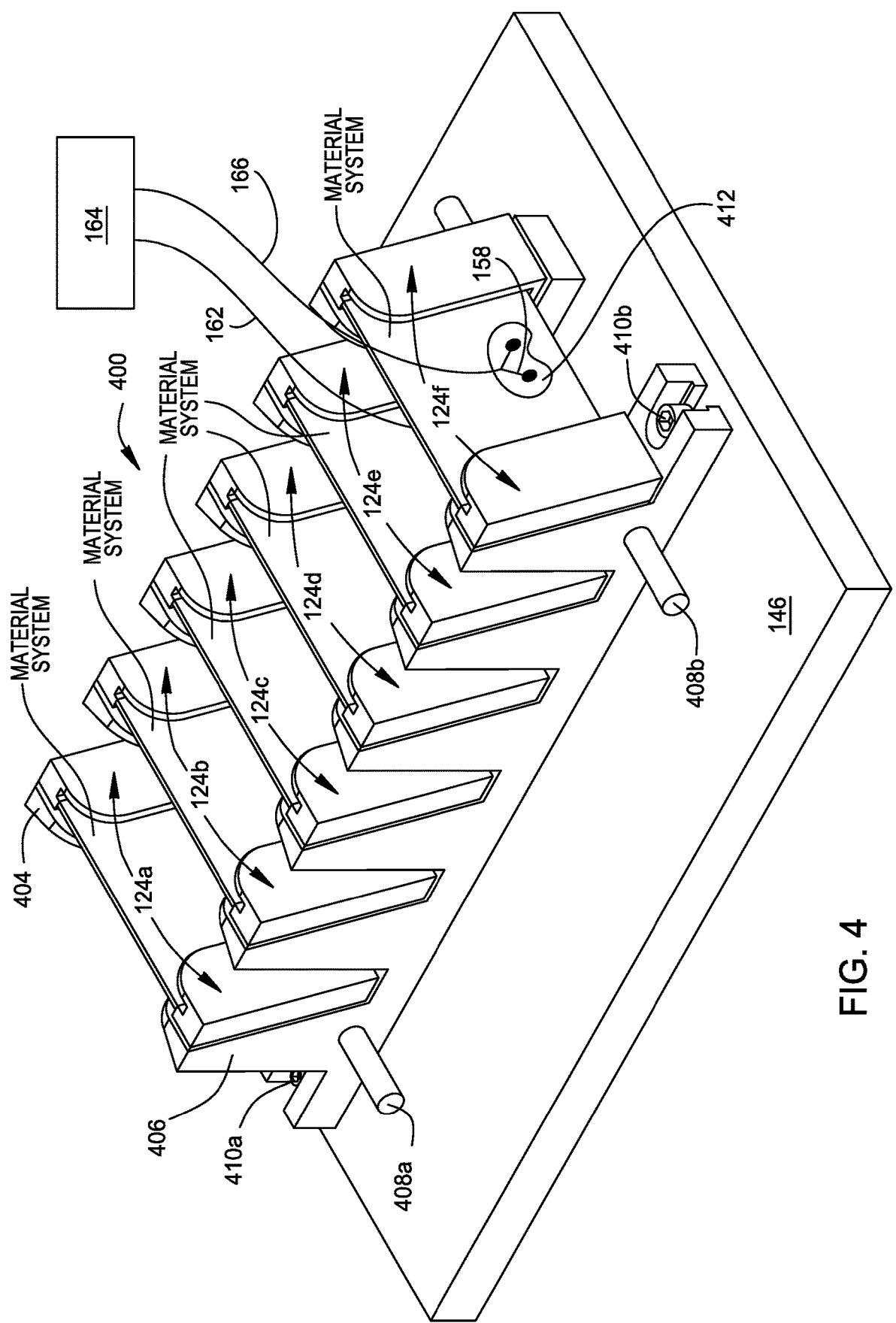
FIG. 4 is a perspective view of a flexer configured to perform cyclic flexing, according to an aspect of the disclosure.

To facilitate control of the apparatus 100 described above, the CPU 140 may be one of any form of general purpose computer processor that can be used in an industrial setting, such as a programmable logic controller (PLC), for controlling various chambers and sub-processors. The memory 142 is coupled to the CPU 140, and the memory 142 is non-transitory and may be one or more of readily available memory such as random access memory (RAM), read only memory (ROM), floppy disk drive, hard disk, or any other form of digital storage, local or remote. Support circuits 144 are coupled to the CPU 140 for supporting the processor in a conventional manner. Information obtained from cyclic flexing fog spray processes with apparatus 100 may be stored in the memory 142, typically as a software routine. The software routine may also be stored and/or executed by a second CPU (not shown) that is remotely located from the hardware being controlled by the CPU 140. The memory 142 is in the form of computer-readable storage media that contains instructions, that when executed by the CPU 140, facilitates the operation of the apparatus 100. The instructions in the memory 142 are in the form of a program product such as a program that implements a process of the present disclosure. The program code may conform to any one of a number of different programming languages. In at least one aspect, the disclosure may be implemented as a program product stored on computer-readable storage media for use with a computer system. The program(s) of the program product define functions of the aspects (including the methods described herein). Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods and apparatus of the present disclosure, are aspects of the present disclosure.

FIG. 3 is a perspective view of an enclosure, such as the enclosure 136 of FIG. 1 and FIG. 2. As shown in FIG. 3, enclosure 136 includes motor or actuator 126 and an insulating plate 302 disposed within enclosure 136. Insulating plate 302 can comprise a mounting plate disposed on a grate. Insulating plate 302 includes one or more insulating materials, such as a polyethylene (e.g., high density polyethylene) and/or fiberglass. Insulating plate 302 is coupled with (e.g., in direct contact with) motor/actuator 126 to provide maintenance of the temperature of motor/actuator 126. A first gas source 304 provides gas, such as air, to a first portion of motor or actuator 126. A second gas source 306 is disposed along a surface of the insulating plate (e.g. under a lower surface of insulating plate 302) to provide gas, such as air, to a second portion of motor/actuator 126, such as a lower surface of motor/actuator 126, by introducing gas through a recess 308. Recess 308 is disposed in a surface 310 of enclosure 136. The gas of first gas source 304 and second gas source 306 may be supplied by inlet tube 128 (of FIG. 1). Using multiple gas sources provides a substantially uniform gas flow around motor/actuator 126 which can cool motor/actuator 126 and provide substantially uniform temperature of the outer surfaces of motor/actuator 126. Alternatively, first gas source 304 may provide gas to motor/actuator 126, while second gas source 306 is not present or is held in an off mode. Alternatively, second gas source 306 may provide gas to motor/actuator 126, while first gas source 304 is not present or is held in an off mode.

Also shown in FIG. 3, wires (or tubing) 312 are coupled with motor/actuator 126 and provide electrical communication between (i) motor/actuator 126 and a controller, such as controller 138, and/or (ii) motor/actuator 126 and jaws 124*a-e*. If tubing is used, motor/actuator 126 can be a hydraulic or pneumatic actuator where pressurized oil or air can be routed through the tubing to provide temperature maintenance of wires/tubing 312. Additionally or alternatively, gas flow into enclosure 136 further provides temperature maintenance of wires/tubing 312. Wires/tubing 312 may be insulated with one or more insulating materials 314, such as a polyethylene (e.g., high density polyethylene), insulated conductive tape, and/or fiberglass, disposed around the electrical components of wires/tubing 312 to provide temperature maintenance of the electrical components of the wires/tubing 312.

FIG. 4 is a perspective view of a flexer 400 configured to perform cyclic flexing, according to an aspect of the disclosure. Flexer 400 may be located inside of a material performance chamber, such as apparatus 100 as described for FIG. 1. As shown in FIG. 4, flexer 400 includes a mobile block 404 and a stationary block 406. Stationary block 406 is mounted to plate 146 by mounting bolts 410*a* and 410*b*. Mobile block 404 is slidably disposed on plate 146 adjacent to stationary block 406. Linear displacement between stationary block 406 and mobile block 404 is maintained by guide rods 408*a* and 408*b*. Guide rods 408*a* and 408*b* may comprise stainless steel, high density polypropylene, high density polyethylene, chromium, such as an Armology coating, and combinations thereof. Each of guide rods 408*a* and 408*b* is coupled with stationary block 406 and mobile block 404. Guide rods 408*a* and 408*b* are parallel to one another. Stationary block 406 and mobile block 404 mount or otherwise support jaws 124*a-f*. Stationary block 406 mounts a first side of jaws 124*a-f* in a stationary position during flexing, while mobile block 404 mounts a second side of jaws 124*a-f* and allows movement of the second side of jaws 124*a-f* during flexing. Stationary block 406 and mobile block 404 may comprise high density polyethylene. During flexing, the mobile block is shifted laterally relative to the stationary block from a starting point to an end point resulting in flexing of the material system positioned in jaws 124*a-f*. The starting point, end point, and shift distance may be controlled by a user of flexer 400 based on test fixture mechanical boundary limits, mechanical stop blocks, or fixture driving system software controls. Each of stationary block 406 and mobile block 404 includes a base and a plurality of stanchions extending from the base perpendicular thereto. Each stanchion may be rectangular or angled to provide an angle on which each of the jaws 124a-f can be mounted. Jaws 124a-f are hinged, which allows bending of a material system while compressing the material system. For example, jaws 124a-f may be mounted on one side of each stanchion and disposed at an angle from, for example, 15° to 30° relative to a line perpendicular to the base. Other angles relative to perpendicular are contemplated to achieve a desired testing condition for a material panel. The angle of jaws 124a-f determines the angular position of the material system. In at least one aspect, a material system is disposed at an angle from, for example, 15° to 30° relative to a line perpendicular to the base. In at least one aspect, jaws 124a-f are non-conductive and non-metallic so as to have little or no galvanic effect on the material system. One or more of jaws 124a-f may comprise high density polyethylene, commercial grade Titanium (II) with polyethylene insert, sacrificial 316SS with polyethylene insert, or combinations thereof, which prevents (partial or complete) galvanic corrosion of the jaws and material systems during testing. One or more of jaws 124a-f may comprise a sleeve cover comprising, for example, polyethylene, which further prevents galvanic corrosion of the jaws and material systems during testing. Electrode pair 158 of apparatus 100 is directly disposed on a first side of a material system disposed in jaw 124f, and electrode pair 156 (not shown) of apparatus 100 is disposed on a second side of the material system opposite the first side. A non-conductive protective coating 412 (shown as a transparent coating for simplicity) is disposed on electrode pairs 158 and 156 to protect the electrodes from a corrosive environment while apparatus 100 is in use, e.g. testing the material system. Non-conductive protective coatings include non-conductive epoxy, tape, adhesive, sealant, or mixtures thereof. In at least one aspect, non-conductive epoxy is a 2-part waterproof epoxy. Although FIG. 4 shows electrodes directly disposed on a material system disposed in jaw 124f, it is to be understood that material systems (and apparatus) of the present disclosure embrace aspects where one or more electrodes and/or electrode pairs are not directly disposed on material systems disposed in one or more of jaws 124a-e, and the electrodes and/or electrode pairs can be in electrical communication with spectrometer 164 via electrical lines similar or identical to electrical lines 162, 166. Such aspects provide electrochemical in situ monitoring of a plurality of material systems within a material performance chamber, such as apparatus 100. Furthermore, a non-conductive protective coating, such as coating 412, can be disposed on said electrodes and/or electrode pairs.

In at least one aspect of the present disclosure, an apparatus contains more than one flexer 400. In at least one aspect where a material performance chamber contains more than one flexer 400, guide rods 408a and 408b extend through multiple flexers 400.

A flexer, such as flexer 400, provides variable displacement of a mobile block and material systems at variable frequencies that are adjustable in real-time. A flexer also provides for application of tension and compression to a material system.

Material Systems

Material systems can be used in the apparatus of FIG. 1 or FIG. 2. In at least one aspect, a material system is a metal panel that can be flat and can be coated. The material performance of the flat panel is tested by cyclically flexing the material system while exposing the panel to at least a cycle of humidity, e.g. salt fog. Before, during, and/or after exposure and flexing, the material system is assessed for coating impedance, coating cracking/delamination, corrosion onset, rate of propagation, and performance.

In at least one aspect, a material system comprises a substrate having two flat metal panels connected, joined, welded, bonded, or fastened together using metallic fasteners, screws, bolts, or other hardware, before being exposed to at least a cycle of humidity.

In at least one aspect, a material system comprises a mechanical joint or knuckle joint that may be made of metallic or composite materials and coated before being exposed to cyclic humidity and/or before being assessed for coating impedance, coating cracking/delamination, corrosion onset, rate of propagation, and performance.

In at least one aspect, a material system comprises a structural system replicative of aircraft components, representing a side-of-body joint, a stringer-to-fuselage assembly, a fuselage panel, or wing spar-to-fuselage assembly. The produced assemblies may be actuated or flexed while being exposed to at least a cycle of humidity before/while being assessed for coating impedance, coating cracking/delamination, corrosion onset, rate of propagation, and performance, as described herein.

Figure 5:
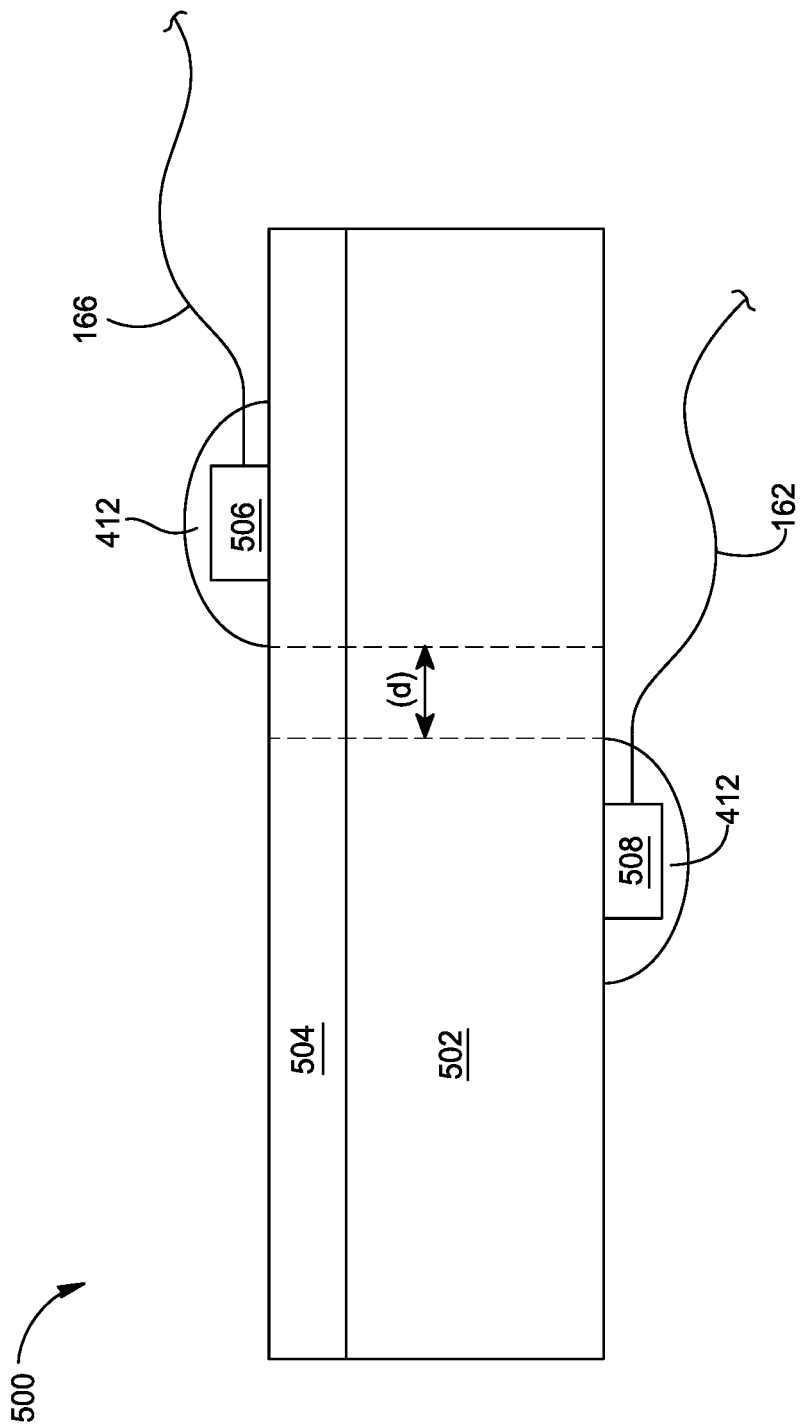
FIG. 5 is a side view of a material system, according to an aspect of the disclosure.

FIG. 5 is a side view of a material system 500 that can be tested within the apparatus shown in FIG. 1 or FIG. 2. Material system 500 comprises a conductive metal substrate 502 and a coating layer 504 disposed on substrate 502. Metal substrate 502 can be made of titanium, aluminum, copper, or alloys thereof. Metal substrate 502 may be coated with one or more primers, such as a chromated primer, surface finishes and/or top coats. For example, coating layer 504 can be made of chromated primer, epoxy primer, urethane primer, or mixtures thereof. Electrode 506 (which can be part of an electrode pair such as electrode pair 158) is directly disposed on coating layer 504 and is a reference electrode. Electrode 508 (which can be part of an electrode pair such as electrode pair 156) is disposed on the metal substrate 502 and is a working electrode. In at least one aspect, an insulating adhesive, such as non-conductive epoxy, is disposed between electrode 508 and metal substrate 502. For spectroscopic measurements during testing, the working electrode 508 is adhered to conductive metal substrate 502, and an electrical signal is sent through the working electrode (or pair of electrodes). The signal then moves through coating layer 504 and is received by electrode 506 (of electrode pair 158) and transmitted to spectrometer 164. In an alternative aspect, working electrode 508 and reference electrode 506 is each disposed (e.g., directly disposed) on coating layer 504.

In aspects where a coating layer, such as coating layer 504, is made of an epoxy and an electrode disposed on the coating layer is made of a conductive epoxy, it has been discovered that the epoxy materials of the coating layer and the electrode absorb to one another. Alternatively, an electrodes is or contains nickel. Use of an adhesive to adhere the two materials together is optional such that the electrode is directly disposed on the coating layer. In such aspects, a surface of the coating layer can be lightly abraded, followed by applying the electrode directly to the abraded surface. In the case of epoxy electrodes, this "like-on-like" interaction between coating layer and electrode improves compatibility of the interface of the electrode and coating layer. The improved compatibility between the electrode and coating layer improves thermal and mechanical properties between the coating layer and the electrode. Conventional electrodes are adhered to a substrate surface with non-conductive adhesives. These adhesives interfere with the electrical communication of the electrode and a substrate such as a coating layer, yielding inaccurate spectroscopic data. With use of such adhesives, the electrical properties of the material system are being affected by a component (the adhesive) that is not a component of a material system that would likely be used in commercial applications of the material system. The adhesive causes a sharp gradient in mechanical, chemical, and thermal performances of the material system where the electrode is located. The improved compatibility between electrodes and coating layers of material systems of the present disclosure provides homogeneity between the electrodes and coating layers yielding reduced noise observed in a spectroscopic signal.

As a comparative example to material systems having epoxy electrodes, a material system having metal electrodes deposited onto a coating layer was tested. Electrochemical monitoring of the material system having metal electrodes deposited onto a coating layer provided an EIS spectrum showing only an "air" curve, indicative of an insufficient interaction between the metal electrodes and the coating layer. As used herein, "air curve" indicates an open-lead experiment. This experiment records an EIS spectrum with no cell attached. The spectrum from an open-lead experiment looks very much like a noisy spectrum for a parallel RC network. So, when an air curve is observed in the data, the leads from the spectrometer are not making electrical contact with the coating, and an EIS spectrum of the open air (i.e. an "air curve) is being collected.

Furthermore, it has been discovered that the thickness of electrodes of a material system can affect spectroscopic results of electrochemical monitoring. Electrodes of the present disclosure, such as electrodes 506 and 508 of electrode pairs 156 and/or 158, can have a thickness of about 100 micrometers ($\mu m$) or less, such as 40 micrometers or less, such as from about 30 micrometers to about 40 micrometers, such as about 35 micrometers or less, such as about 20 micrometers or less, such as about 12 micrometers or less. For example, electrodes having a thickness of about 12 $\mu m$ or less provide flexibility of the electrodes disposed on and/or within a material system and provide material systems operable to have an electrode disposed on one or more layers of the material system for more accurate electrochemical monitoring of each of the one or more layers of a material system. In at least one aspect, electrodes of the present disclosure have a thickness of from about 1 $\mu m$ to about 12 $\mu m$, such as from about 2 $\mu m$ to about 11 $\mu m$, such as from about 3 $\mu m$ to about 10 $\mu m$. In at least one aspect, a coating layer of the present disclosure has a thickness of from about 1 $\mu m$ to about 500 $\mu m$, such as from about 2 $\mu m$ to about 250 $\mu m$, such as from about 3 $\mu m$ to about 100 $\mu m$, such as from about 4 $\mu m$ to about 15 $\mu m$. Furthermore, the reduced size of the electrodes of the present disclosure provides smaller/thinner electrical wires (coupled with the electrodes at a first end and a spectrometer at a second end) to be used for material systems of the present disclosure, as compared to traditional electrical wires that are too large to be embedded within layers of a multilayered material system.

In comparison, an electrode having a thickness of 13 $\mu m$ or greater (such as interdigitated electrodes) is more rigid than thinner electrodes and tends to disconnect from the material system during flex testing. The rigidity of thick electrodes hinders the electrode's ability to conform to a surface of the material system. Furthermore, if a conventionally thin coating layer (such as an assembly primer, interior primer, fuel tank primer) is disposed on an electrode, electrodes having a thickness of 13 $\mu m$ or greater tend to create a defect in the overlying layer and the defect is then accentuated over the course of flex testing. Furthermore, some conventional electrode designs involve drilling through the substrate to embed electrodes within a layer. Such embedded electrodes have similar drawbacks as described for thick electrodes.

In at least one aspect, electrodes of a material system of the present disclosure (e.g., that can be tested within the apparatus shown in FIG. 1 or FIG. 2) are offset from one another. For example, as shown in FIG. 5, electrodes 506 and 508 are offset from one another by a distance (d). Offsetting the electrodes of material systems of the present disclosure reduces moisture effects because an electrical signal flows where the electrons have the least resistance. If the electrodes are not offset from one another, then the area under the reference electrode is shielded from absorbing electrolyte from moisture. As moisture content within a coating increases (e.g., in the cracks/crevices) during testing, the accuracy of electrical data is improved because of the relatively high dielectric constant of water and saline as compared to the dielectric constant of most intact coatings. For example, the electrodes themselves are protected from moisture or the electrical signal may be inaccurate. Protecting an electrode from moisture may be accomplished by sealing an electrode with a protective coating, such as a non-conductive epoxy.

Figure 6:
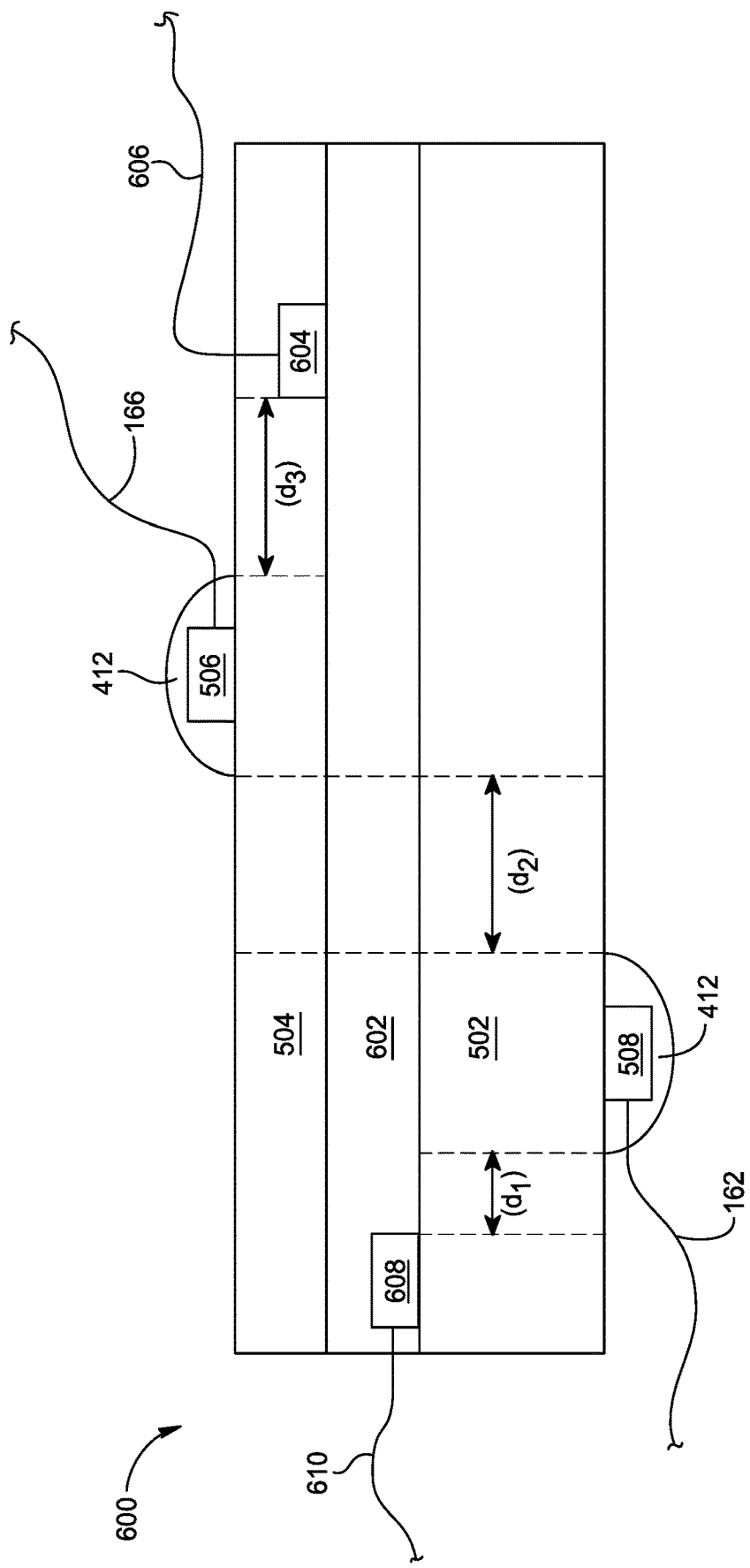
FIG. 6 is a side view of a material system, according to an aspect of the disclosure.

FIG. 6 is a side view of a material system 600 that can be tested within the apparatus shown in FIG. 1 or FIG. 2, according to an aspect of the present disclosure. As shown in FIG. 6, material system 600 is a multilayered material system comprising metal substrate 502, a first coating layer 602, and a second coating layer 504. Electrode 608 (which can be of an electrode pair) is disposed on metal substrate 502 and is in electrical communication with a spectrometer, such as spectrometer 164, via electrical line 610. Furthermore, electrode 604 (which can be of an electrode pair) is disposed on first coating layer 602 and is in electrical communication with a spectrometer, such as spectrometer 164, via electrical line 606. A protective coating (not shown), such as coating 412, can be disposed on one or both of electrodes 608 and 604 before depositing a subsequent coating layer onto the electrodes and substrate. As shown in FIG. 6, electrodes 608 and 604 are internal to (e.g., embedded) the material system. Internal electrodes provide in situ electrochemical monitoring of individual layers of a material system at a coating/substrate interface of a multilayered material system to determine coating degradation and/or corrosion. In at least one aspect, an insulating adhesive, such as non-conductive epoxy, is disposed between electrode 608 and metal substrate 502.

As shown in FIG. 6, electrode 608 and electrode 508 are offset by a distance ($d_1$). Electrode 508 and 506 are offset by a distance ($d_2$). Electrode 506 and electrode 604 are offset by a distance ($d_3$). ($d_1$), ($d_2$), and ($d_3$) are sized to prevent polarizing an electrode, which would otherwise move away from the pseudo-linear portion of a voltage-current response curve. In at least one aspect, ($d_1$)=($d_2$)=($d_3$). In at least one aspect, ($d_1$), ($d_2$), and/or ($d_3$) is between about 0.3 cm and about 10 cm, such as between about 0.5 cm and about 3 cm, for example about 1 cm.

Furthermore, varying the surface area of a surface of an electrode that contacts an underlying surface affects the electrochemical interaction of the electrode with the underlying surface. One way to take advantage of varying the surface area for a desired application is to vary the shape of one or more electrodes because, other parameters being equal, different shapes result in different surface areas of a contact surface of the electrode, as explained in more detail below. Electrodes of material systems of the present disclosure can have a variety of shapes. For example, an electrode of the present disclosure is square shaped. Alternatively, an electrode of the present disclosure has a shape selected from circular, star, rectangular, or polygonal, such as pentagonal, hexagonal, heptagonal, or octagonal. Furthermore, electrodes of the present disclosure may have one or more spokes extending (e.g., outwardly) from the shape.

An electrode of the present disclosure has a surface area (including spokes if present) that contacts an underlying layer (i.e., a contact surface area) that is suitable for a desired application. In at least one aspect, an electrode has a contact surface area from about 0.2 $cm^2$ to about 10 $cm^2$, such as from about 0.5 $cm^2$ to about 5 $cm^2$, such as from about 1 $cm^2$ to about 2 $cm^2$. The overall shape, spokes, and surface area can affect electrochemical monitoring methods for a particular testing application of the present disclosure.

Figure 7C:
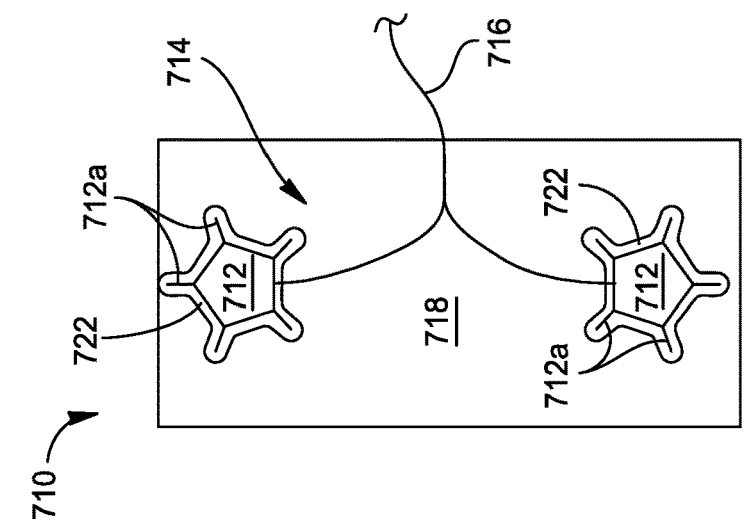
FIG. 7C is a plan view of a material system according to an aspect of the disclosure.
Figure 7B:
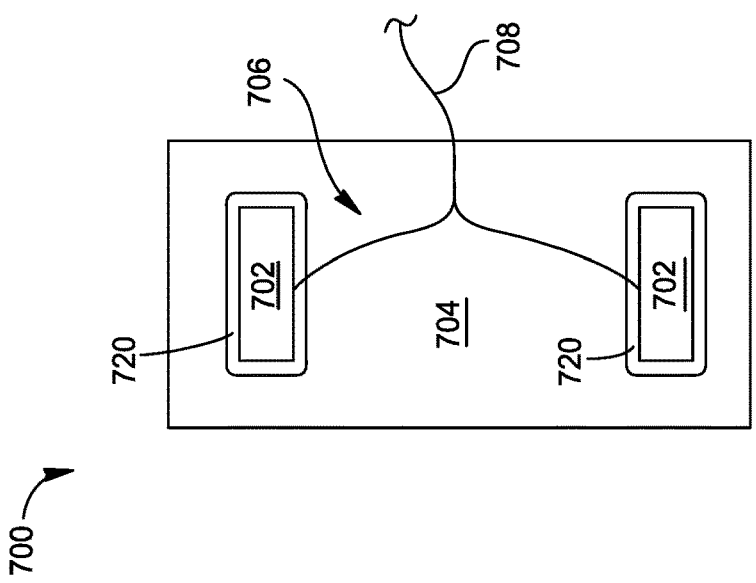
FIG. 7B is a plan view of a material system according to an aspect of the disclosure.
Figure 7A:
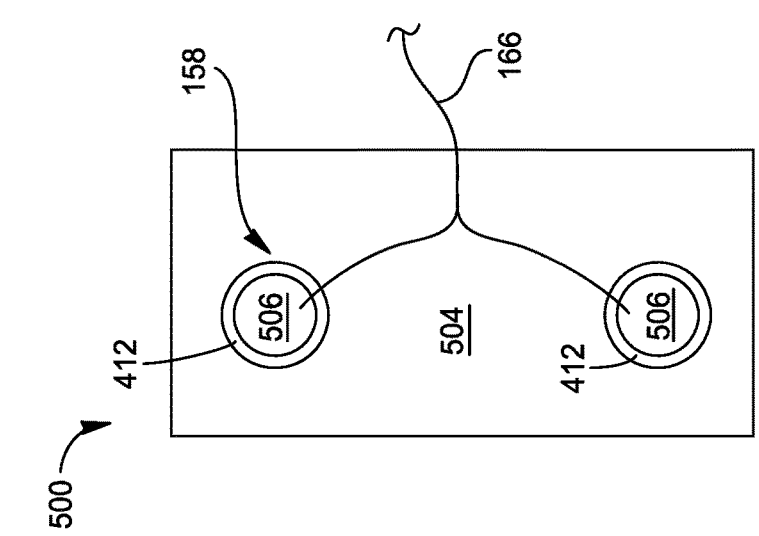
FIG. 7A is a plan view of a material system according to an aspect of the disclosure.

Each of FIGS. 7A, 7B, and 7C is a plan view of a material system that can be tested within the apparatus shown in FIG. 1 or FIG. 2 according to an aspect of the present disclosure. As shown in FIG. 7A, material system 500 (of FIG. 5) comprises electrode pair 158 comprising electrodes 506 having a circular shape. Protective coating 412 is disposed on electrodes 506. In at least one aspect, protective coating 412 is also disposed on electrical wire 166 (not shown) to further protect wire 166 during flexing and/or humidity exposure. As shown in FIG. 7B, material system 700 comprises electrode pair 706 comprising electrodes 702 having a rectangular shape. Each of electrodes 702 is disposed on material layer 704. Protective coating 720 (shown as transparent for clarity) is disposed on electrodes 702. In at least one aspect, protective coating 720 is also disposed on electrical wire 708 (not shown) to further protect wire 708 during flexing and/or humidity exposure. Each of electrodes 702 can be in electrical communication with a spectrometer via electrical line 708. As shown in FIG. 7C, material system 710 comprises electrode pair 714 comprising electrodes 712 having a pentagonal shape. Each of electrodes 712 has five spokes 712a extending outwardly from the pentagonal shape of electrodes 712. Each of electrodes 712 is disposed on material layer 718. Protective coating 722 (shown as transparent for clarity) is disposed on electrodes 712/712a. In at least one aspect, protective coating 722 is also disposed on electrical wire 716 (not shown) to further protect wire 708 during flexing and/or humidity exposure. Electrodes 702 can be in electrical communication with a spectrometer via electrical line 716.

Additionally or alternatively, the extent of corrosion of a material system of the present disclosure may be determined by a mass loss technique by weighing the material system after a cyclic flexing process and subtracting the weight from the weight of the material system before the cyclic flexing process. The mass loss technique is advantageous in aspects where electrodes are not disposed on material systems of the present disclosure.

Fabricating Material Systems

Fabricating a material system that can be tested within the apparatus shown in FIG. 1 or FIG. 2 of the present disclosure can include lightly abrading an area of a coating layer that the electrode will be applied to. The abraded area can be cleaned with any suitable solvent and allowed to dry. Fabricating further includes disposing an electrode onto a coating layer, such as an abraded area of the coating layer. An end portion of insulation of an electrical wire, such as wire 166, can be removed to form an exposed portion of the electrical wire. The exposed portion is then contacted with an electrode, followed by application of non-conductive tape and/or a protective coating, such as protective coating 412.

Electrodes (and coating layers) of the present disclosure may be disposed on a metal substrate or layer by any suitable deposition process. Deposition processes include screen printing and 3D printing. In addition, photolithography may be applied to a coating layer followed by deposition of an electrode into the photolithographed region of the layer.

An electrode, for example, may be deposited using any suitable screen printing apparatus supplied, for example, by ASM Assembly Systems of Munich, Germany. Screen printing can be performed using a screen having one or more openings shaped with the desired geometry for electrode formation. A deposition material may be placed onto a portion of the screen and then squeegeed across the opening with a squeegee. More specifically, the screen is located over and just above the surface to be printed so that ink can be accurately deposited in the desired position. The mesh of the screen is brought into contact with the surface by the squeegee as it is moved across the screen. Ink is pushed into the open area forming the pattern and the surplus is removed by the edge of the squeegee. The mesh should peel away from the surface immediately behind the squeegee, leaving all the ink that was in the mesh deposited on the printing surface. The screen can then be lifted clear. The recommended screen tension is the tension necessary to stretch the mesh sufficiently to cause the screen to peel away from the substrate after printing but not be stretched so much that damage occurs. The applied tension depends on the screen material, e.g. the extension used for nylon meshes is typically 6% and for polyester 3%. It is normal practice for the squeegee to be held at a 45° angle relative to the frame area.

An electrode, for example, may be deposited using any suitable 3D printing apparatus supplied, for example, by nScrypt, Inc. of Orlando, Fla. The nScript apparatus dispenses a conductive ink, e.g. DuPont CB230 silver-coated copper conductive ink or DuPont CB028 flexible silver ink, at a material flow rate that is adjusted by backpressure on the nozzle. The speed of the nozzle movement while patterning is constant, and the backpressure of the material in the nozzle is directly proportional to the flow rate. The nScrypt printing apparatus has a range of backpressures from 0 psi to about 30 psi. For the deposition of conductive ink onto coated panels, 18 psi backpressure can be used, which corresponds to a flow rate of about 0.052 grams/minute. After deposition of electrodes with the nScript apparatus, ink is baked for a fixed time at an elevated temperature to facilitate curing, e.g. 170° C. for 30 minutes.

A coating layer, for example, may be photolithographed using any suitable photolithography apparatus. Electrodes formed by photolithography are typically interdigitated electrodes.

Suitable interdigitated electrodes can be obtained from, for example, Synkera Technologies, Inc. of Longmont, Colo. or Micrux Technologies, S.L. of Oviedo, Spain.

Testing Methods

A material testing process such as a cyclic flexing fog spray process, for example, within apparatus 100, may be performed by exposing a material system, such as a panel, to a treating fluid, such as a salt fog, and flexing the material system. The exposing may be performed for from about 1 hour to about 4500 hours, such as about 200 hours to about 2000 hours, such as about 500 hours to about 1000 hours. In at least one aspect, the exposure zone in the chamber, such as chamber 160 configured to control one or more of humidity, pressure, or temperature, has a relative humidity of from about 0% to about 98%, such as from about 30% to about 95%, such as about ambient humidity. Exposing a material system to a treating fluid for about 1 hour and/or a relative humidity of about 30% or less mimics, for example, humidity exposure experienced by the material system as part of an aircraft in an arid climate. Exposing a material system to a treating fluid for about 4500 hours and/or a relative humidity of about 80% or more mimics, for example, humidity exposure experienced by the material system as part of an aircraft in a very humid climate or a moderately humid climate for a prolonged period of time. A number of humidity cycles may be performed during a process of the present disclosure, and may be from about 1 cycle to about 100,000 cycles, such as from about 2 cycles to about 1,000 cycles, such as from about 3 cycles to about 100 cycles, such as from about 5 cycles to about 10 cycles. These humidities can be cycled during cyclic flexing. For example, a first flexing (e.g. 100 flexing cycles) can be performed at a first humidity, and a second flexing (e.g. 100 flexing cycles) can be performed at a second humidity different than the first humidity.

The fluid may contain water that is reagent grade water. The fluid may be a salt solution. The salt solution may comprise sodium chloride. The salt solution may contain about 2 parts sodium chloride in 98 parts water to about 6 parts sodium chloride in 94 parts water, such as about 5 parts sodium chloride in about 95 parts water. The liquid, such as a salt solution, may contain less than about 0.1% of bromide, fluoride and iodide. The liquid, such as a salt solution, may contain less than about 1 ppm, such as about 0.3 ppm, by mass of copper. The liquid, such as a salt solution, might not contain anti-caking agents, as such agents may act as corrosion inhibitors. Material systems which may be tested include, for example, aircraft panels which may form the skins or fuselage of an aircraft, a coated lap joint between two metal panels, a wing-to-fuselage assembly, and combinations thereof. The liquid may be atomized to form the treating fluid, such as a salt fog, that may have a pH ranging from about 3 to about 11, such as about 5 to about 8, such as about 6.5 to about 7.2. pH may be measured using a suitable glass pH-sensing electrode, reference electrode, and pH meter system. It may be desirable to adjust the pH of the liquid. For example, a liquid having a low pH may mimic a polluted atmosphere containing acid rain and the like. Furthermore, pH of the liquid that is atomized into the treating fluid may be adjusted to recalibrate the liquid during an exposing process. pH may be adjusted by, for example, addition of hydrochloric acid (HCl) to decrease the pH or addition of sodium hydroxide (NaOH) to increase the pH. The fluid, such as a salt fog, may be flowed at a rate of about 0.5 milliliters per hour (mL/h) to about 5 mL/h per 80 cm$^2$ of horizontal collection area, such as about 1 mL/h to about 2 mL/h per 80 cm$^2$ of horizontal collection area.

In at least one aspect, a material system, such as a panel, may be flexed by one of jaws 124*a-e* or by a plurality of jaws 124*a-e*. Flexing may be performed at varying frequencies to mimic the effect of mechanical stresses for corrosive conditions experienced by an aircraft material system under real world conditions. For example, a material system may be flexed at a frequency from about 0.1 Hertz (Hz) to about 150 Hz, about 0.1 Hz to about 100 Hz, about 0.1 Hz to about 60 Hz. A number of cycles during cyclic flexing may be from about 1 cycle to about 100,000 cycles, such as from about 500 cycles to about 5,000 cycles, such as from about 500 cycles to about 3,000 cycles.

Furthermore, the greater the curvature of a flexed material system, the greater the degradation to the material system using apparatus and methods of the present disclosure. For example, a flat panel having a length of 6 inches may be gripped by two jaws with a distance of 6 inches between the two jaws. The panel may be flexed at a rate of 0.33 Hz during exposure to a fluid. In another example, a flat panel having a length of 7.5 inches may be gripped by two jaws also having a distance of 6 inches between the two jaws. The panel may be flexed at a rate of 0.33 Hz during exposure to a fluid. The panel having a length of 7.5 inches has an increased curvature and undergoes increased degradation as compared to the panel having a length of 6 inches under otherwise identical conditions. Without being bound by theory, mechanical stresses that give curvature to a material system result in cracking of the material system which permits access of corrosive fluid, such as a salt fog, into a crack of the material system. After entering a crack of the material system, corrosive fluid may further enter between various additional layers (such as an underlying coating layer), if present. Accordingly, corrosive fluid may cause corrosion of the material system and/or one or more of the additional layers of the material system. Such conditions mimic the conditions experienced by an aircraft material system, such as a panel, during real world use.

In at least one aspect, an exposure zone, such as a chamber configured to control one or more of humidity, pressure, or temperature 160 of apparatus 100, may be maintained at a temperature ranging from about −196° C. to about 100° C., such as about −50° C. to about 95° C., such as about 0° C. to about 50° C., such as about 33° C. to about 37° C., for example about 35° C., during the exposing of a material system to a treating fluid (such as a salt solution atomized into a salt fog), and/or the flexing the material system. For example, the temperature can be maintained at a deep freeze temperature, such as from about −70° C. to about −20° C., such as about −55° C. Alternatively, the temperature can be maintained at a high temperature, such as from about 50° C. to about 80° C., such as about 60° C. The temperature may be monitored by a recording device or by a thermometer (not shown) that can be read from an outside surface of the apparatus, such as apparatus 100. In at least one aspect, exposing a material system, such as a panel, to a fluid, such as a salt fog, and flexing the material system may be performed concurrently. In at least one aspect, exposing a material system, such as a panel, to a fluid, such as a salt fog, and flexing the material system may be performed sequentially. In at least one aspect, a material system may be exposed to a humidity and flexed concurrently as well as sequentially, which provides recreation of an irregular or variable flight-specific strain profile that may be experienced by a material system in service. In at least one aspect, exposing a material system to a fluid and/or flexing the material system may be interrupted to visually inspect, rearrange, or remove the material system, and/or replenish a solution, such as a solution in liquid reservoir 104. For processes using a low humidity atmosphere in the chamber (exposure zone), a vacuum can be used to remove air from the chamber (exposure zone) and/or dry air (e.g., relative humidity less than 30%) can be provided to the chamber (exposure zone) without the introduction of a fluid, such as a salt fog.

A gas, such as air, can be introduced to an apparatus at a pressure of from about 15 PSI to about 200 PSI, such as from about 15 PSI to about 20 PSI, such as about 60 PSI. A number of pressure cycles may be performed during a process of the present disclosure, and may be from about 1 cycle to about 100,000 cycles, such as from about 2 cycles to about 1,000 cycles, such as from about 3 cycles to about 100 cycles, such as from about 5 cycles to about 10 cycles. These pressures can be cycled during cyclic flexing. For example, a first flexing (e.g. 100 flexing cycles) can be performed at a first pressure, and a second flexing (e.g. 100 flexing cycles) can be performed at a second pressure different than the first pressure. The temperature of the gas can have a temperature based upon the temperature of the chamber (exposure zone). For example, under deep freeze conditions, the temperature of the gas introduced to the chamber may be lower than the temperature of a gas introduced to the chamber under high temperature exposure zone conditions. Nonetheless, during a low temperature cyclic flexing process or a high temperature cyclic flexing process, the gas provided to the chamber can have a temperature of from about −30° C. to about 50° C., such as about −10° C. to about 25° C., such as about 0° C. to about 20° C., for example about 10° C. or about 25° C., which may provide a temperature of the chamber (e.g., the atmosphere within the chamber) of from about −30° C. to about 50° C., such as about −10° C. to about 25° C., such as about 0° C. to about 20° C., for example about 10° C. or about 25° C. A number of temperature cycles may be performed during a process of the present disclosure, and may be from about 1 cycle to about 100,000 cycles, such as from about 2 cycles to about 1,000 cycles, such as from about 3 cycles to about 100 cycles, such as from about 5 cycles to about 10 cycles. These temperatures can be cycled during cyclic flexing. For example, a first flexing (e.g. 100 flexing cycles) can be performed at a first temperature, and a second flexing (e.g. 100 flexing cycles) can be performed at a second temperature different than the first temperature.

Additionally or alternatively, the temperature of the motor/actuator can be controlled using any suitable temperature control device (e.g., a heater) coupled with the motor/actuator. For example, a surface of the motor/actuator may have a temperature of from about −30° C. to about 50° C., such as about −10° C. to about 25° C., such as about 0° C. to about 20° C., for example about 10° C. or about 25° C., as determined by a thermocouple coupled with the surface of the motor/actuator.

Before, during (in situ), and/or after a cyclic process of the present disclosure, the impedance of one or more layers of the material system can be measured using an electrochemical impedance spectrometer. Electrochemical impedance spectroscopy (EIS) provides in situ measurements of impedance of one or more layers of the material system. The measurements provide information for determining coating properties, such as coating degradation, corrosion at the substrate/coating interface, and absorbed moisture over a period of time. Electrochemical impedance spectroscopic processes of the present disclosure can be performed at an excitation potential of from about 5 mV to about 150 mV, such as about 10 mV to about 20 mV. Electrical frequencies for EIS may be from about 0.1 Hz-10,000 Hz, such as from about 1 Hz to about 5,000 Hz, such as from about 1 Hz to about 100 Hz, such as about 0.01 Hz to about 10 Hz, or from about 100 Hz to about 4,000 Hz. In at least one aspect, EIS is performed continuously at a set interval and fixed frequency from about 0.5 Hz to about 100 Hz, such as from about 1 Hz to about 10 Hz.

Aspects

Clause 1. An apparatus comprising:
a chamber configured to control one or more of humidity, pressure, or temperature;
a jaw configured to flex a material system;
an enclosure disposed within the chamber, the enclosure comprising an insulating material;
a motor or actuator disposed within the enclosure;
an inlet tube coupled with the enclosure at a first end and a first wall of the chamber at a second end; and
an outlet tube coupled with the enclosure at a first end and the first wall or a second wall of the chamber at a second end.

Clause 2. The apparatus of clause 1, wherein the insulating material is a polyethylene or fiberglass.

Clause 3. The apparatus of clauses 1 or 2, wherein the insulating material is high density polyethylene.

Clause 4. The apparatus of any of clauses 1 to 3, wherein the insulating material is coupled directly with the motor or actuator.

Clause 5. The apparatus of any of clauses 1 to 4, further comprising a plate disposed between the enclosure and the jaw, the plate comprising an insulating material.

Clause 6. The apparatus of any of clauses 1 to 5, wherein the insulating material of the plate is a polyethylene or fiberglass.

Clause 7. The apparatus of any of clauses 1 to 6, wherein the insulating material of the plate is high density polyethylene.

Clause 8. The apparatus of any of clauses 1 to 7, wherein the jaw comprises an insulating material.

Clause 9. The apparatus of any of clauses 1 to 8, wherein the insulating material of the jaw is high density polyethylene.

Clause 10. The apparatus of any of clauses 1 to 9, wherein the first inlet tube comprises a first gas source and a second gas source.

Clause 11. The apparatus of any of clauses 1 to 10, further comprising:
a first block and a second block;
a first guide rod coupled at a first end with the first block and coupled at a second end with the second block; and
a second guide rod coupled at a first end with the first block and coupled at a second end with the second block.

Clause 12. The apparatus of any of clauses 1 to 11, wherein the first block and the second block comprise a base and a plurality of stanchions extending from the base.

Clause 13. The apparatus of any of clauses 1 to 12, wherein the first block is mounted to a plate disposed between the enclosure and the jaw, the plate comprising an insulating material.

Clause 14. The apparatus of any of clauses 1 to 13, wherein the jaw is disposed on the first block at a first end of the jaw and disposed on the second block at a second end of the jaw.

Clause 15. The apparatus of any of clauses 1 to 14, further comprising:
a controller in electrical communication with a vent, a heater, and the jaw.

Clause 16. The apparatus of any of clauses 1 to 15, wherein the jaw is disposed at an angle from 0° to 90°, such as 15° to 30°, relative to a line perpendicular to a base.

Clause 17. The apparatus of any of clauses 1 to 16, further comprising a second jaw configured to flex a second material system.

Clause 18. The apparatus of any of clauses 1 to 17, wherein the chamber is configured to control each of humidity, pressure, and temperature.

Clause 19. A method for determining material performance comprising:

exposing a material system to a relative humidity of from 0% to 98% and flexing the material system at a first temperature in a chamber, the chamber comprising an enclosure disposed within the chamber and a motor or actuator disposed within the enclosure, wherein the enclosure comprises an insulating material; and operating the motor or actuator at a second temperature different from the first temperature during the flexing.

Clause 20. The method of clause 19, further comprising providing a gas to the enclosure.

Clause 21. The method of clauses 19 or 20, wherein the gas is air.

Clause 22. The method of any of clauses 19 to 21, wherein providing a gas to the enclosure comprises providing the gas from a first gas source to a first surface of the motor or actuator and providing the gas from a second gas source to a second surface of the motor or actuator.

Clause 23. The method of any of clauses 19 to 22, wherein the chamber has a temperature of from about −70° C. to about −20° C. and the enclosure has a temperature of from about −10° C. to about 25° C.

Clause 24. The method of any of clauses 19 to 23, wherein the chamber has a temperature of from about 50° C. to about 80° C. and the enclosure has a temperature of from about −10° C. to about 25° C.

Clause 25. The method of any of clauses 19 to 24, wherein operating the motor or actuator at a second temperature different from the first temperature is performed using a temperature control device coupled with the motor or the actuator.

Clause 26. The method of any of clauses 19 to 25, wherein the flexing is performed at a frequency from about 0.1 Hz to about 60 Hz for about 500 cycles or more.

Clause 27. The method of any of clauses 19 to 26, wherein the chamber has a relative humidity of 30% or less.

Clause 28. The method of any of clauses 19 to 27, wherein the chamber has a relative humidity of 80% or greater.

Clause 29. The method of any of clauses 19 to 28, wherein the exposing the material system and the flexing the material system are performed concurrently.

Clause 30. The method of any of clauses 19 to 29, wherein the exposing the material system and the flexing the material system are performed sequentially.

Clause 31. The method of any of clauses 19 to 30, further comprising detecting impedance of the material system with an electrochemical impedance spectrometer.

Clause 32. An apparatus comprising:
a chamber configured to control one or more of humidity, pressure, or temperature;
a jaw configured to flex a material system;
an enclosure disposed within the chamber, the enclosure comprising an insulating material;
a motor or actuator disposed within the enclosure;
an inlet tube coupled with the enclosure at a first end and a first wall of the chamber at a second end;
an outlet tube coupled with the enclosure at a first end and the first wall or a second wall of the chamber at a second end; and
a controller in electrical communication with one or more of the jaw, the motor or actuator, the inlet tube, and the outlet tube.

Clause 33. The apparatus of Clause 32, further comprising a heater in electrical communication with the controller.

Clause 34. The apparatus of Clauses 32 or 33, wherein:
the apparatus comprises a motor,
the controller is in electrical communication with the motor, and
the motor is in electrical communication with the jaw.

Clause 35. An enclosure comprising:
a motor or an actuator;
an insulating plate coupled with the motor or actuator; and
a first gas source.

Clause 36. The enclosure of Clause 35, further comprising:
a recess disposed in a surface of the enclosure; and
a second gas source disposed along a surface of the insulating plate.

Clause 37. The enclosure of Clauses 35 or 36, wherein the insulating plate comprises one or more of polyethylene or fiberglass.

Clause 38. The enclosure of any of Clauses 35 to 37, wherein the insulating plate is in direct contact with the motor or actuator.

Examples

Materials
Gamry Reference 600 Potentiostat (2)
Thermotron SE-2000 Environmental Chamber with Integrated Flexing Apparatus
Omega Wireless Temperature/Humidity Sensor or Ethernet Data Connection Test Procedure
1. Pre-test Panel Characterization
Place comprehensive test panel on bench top. Perform a full EIS sweep of all good 2-electrode connections in ambient laboratory conditions.
2. Program Potentiostat for EIS Monitoring
Place panel in environmental chamber that is preset to maintain 35° C./95% RH. Program Gamry potentiostats for continuous, 2-electrode EIS monitoring using the following parameters:
Monitoring Impedance of the Conductive Layer
L1-R1 connection (both electrodes embedded in the conductive layer)
10 Hz frequency
10 mV excitation voltage
Monitoring Impedance of the Full Coating Stack-Up
R3-S or L3-S (one electrode in the top coat+one wire soldered directly to the substrate)
10 Hz frequency
10 mV excitation voltage
Leave electrode connections intact for continuous monitoring throughout the test.
3. Program Environmental Test Cycle
Program Thermotron SE-2000 chamber to run 24-hour wet/dry cycles:
Step 1: 10-minute ramp from ambient to 25° C./30% RH
Step 2: 25° C./30% RH for 8 hours (cool, dry step)
Step 3: 10-minute ramp to 35° C./95% RH
Step 4: 35° C./95% RH for 8 hours (hot, wet step)
Step 5: 10-minute ramp to −54° C., uncontrolled RH
Step 6: −54° C. with uncontrolled RH for 8 hours (deep freeze step)
4. Mechanical Flexing
During the final 3 hours of the deep freeze step, slowly flex panel in the dynamic apparatus at 0.1 Hz using an 8 mm displacement. Flex for 500 cycles.
Repeat combined-effects test for 6 cycles—or until test panel failure.

5. Post-test Panel Characterization

After test completes, perform a full EIS sweep of all good 2-electrode connections.

Remove panel from chamber and let sit for a minimum of 24 hours in standard laboratory conditions.

Repeat all 2-electrode EIS measurements in ambient laboratory conditions. This concludes the test.

Figure 8:
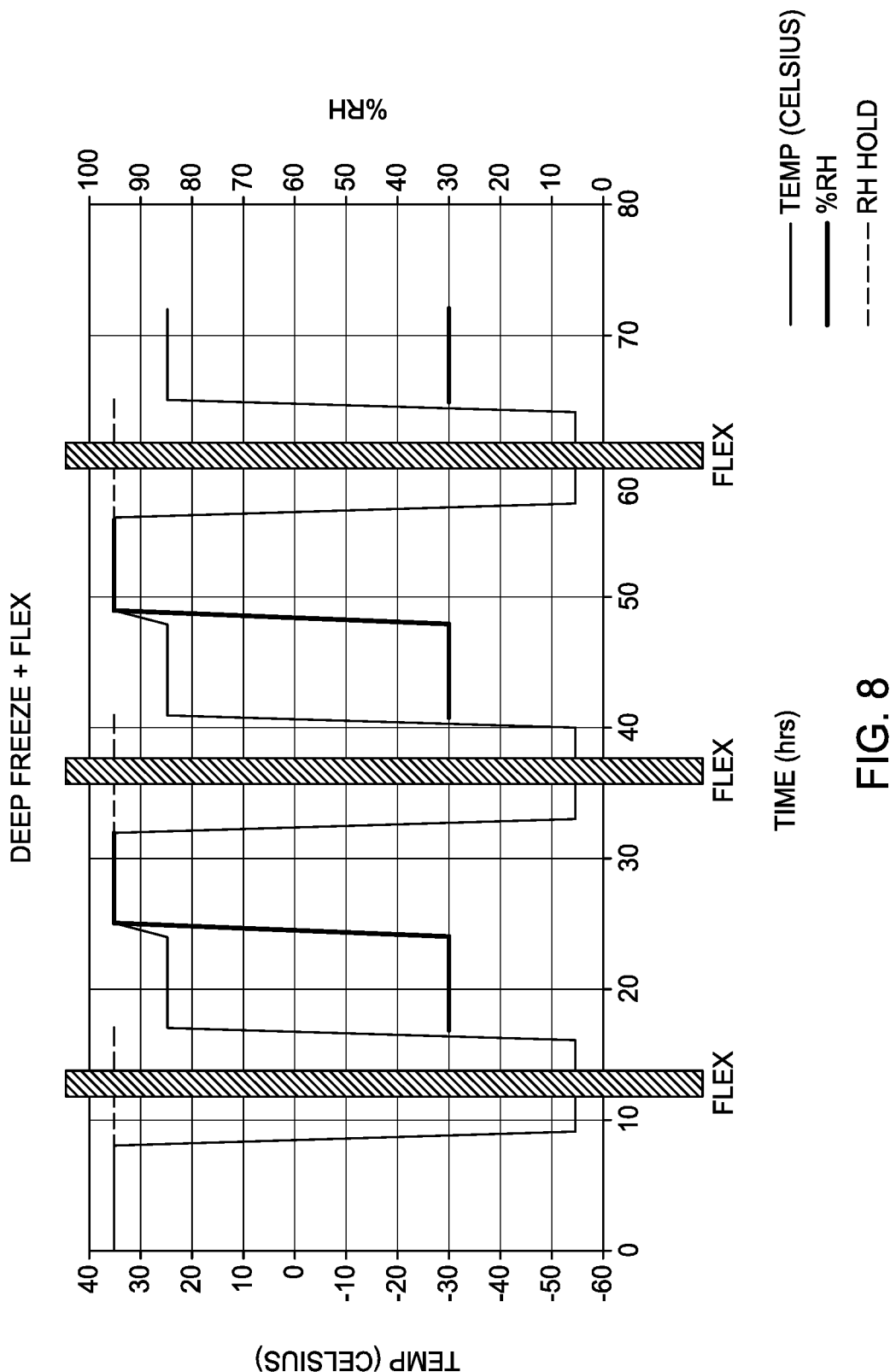
FIG. 8 is a graph of temperature (Celsius) and percent relative humidity vs. exposure time (hours) for an environmental test profile that cycles between three set points: 8 hours of hot, wet conditions at 35° C./95% RH; 8 hours of deep freezing at −54° C. (ambient, uncontrolled RH); and 8 hours of cool, dry conditions at 25° C./30% RH.

In one test using the apparatus and methods described herein, a simulated lap joint panel having an aluminum substrate, notched gap, multilayer coating system (with one or more conductive layers), and embedded sensors was subjected to a cyclic test protocol consisting of dynamic mechanical flexing concurrent with cyclic environmental exposure containing a deep freeze hold (FIG. 8). The objective of the test was to investigate degradation in the coating stack-up when test panels were subjected to multiple concurrent stressors that include cyclic environmental exposure and dynamic mechanical flexing under sub-zero temperatures. The degradation modes of interest included moisture diffusion through the coating stack-up, crack formation in the conductive layer (as measured by coating impedance), and crack formation and growth over the notched gap.

To initiate these mechanisms, test panels were subjected to environmental cycling between three set points: 8 hours of hot, wet conditions at 35° C./95% relative humidity (RH); 8 hours of deep freezing at −54° C. (ambient, uncontrolled RH); and 8 hours of cool, dry conditions at 25° C./30% RH (FIG. 8). Panels were subjected to 500 cycles of dynamic flexing at the end of the deep freeze step (FIG. 8). Flexing was imparted with an 8 mm displacement, equivalent to ~1% strain over the gap. Coating degradation was monitored with continuous impedance of the conductive layer (electrodes L1-R1) and stack-up (electrodes L3-S/R3-S). Cracking of the conductive layer was monitored via in situ EIS measurements, during both temperature/humidity cycling, as well as flexing at freezing conditions.

Figure 9:
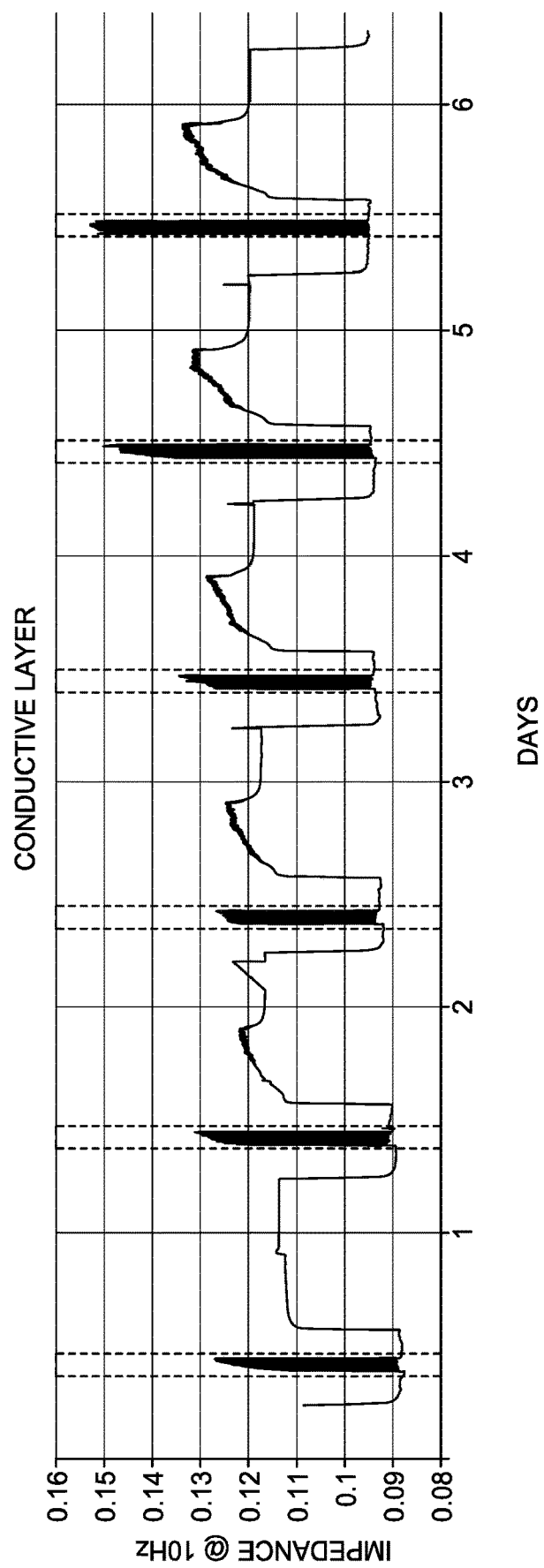
FIG. 9 is a graph of conductive coating layer impedance (Ohms) vs. exposure time (days) for a simulated lap joint panel exposed to cyclic testing at sub-zero temperatures.

The measured coating impedance decreased upon freezing to −54° C. and increased upon heating (FIG. 9). Sharp increases in the measured impedance were observed as the panel was flexed at −54° C., applying strain across the gap (FIG. 9, dashed boxes). However, during periods when the panel was not flexed, the impedance decreased, returning nearly to the baseline value. Over several days of cycling, the baseline impedance increased slightly. Without being bound by theory, it is hypothesized that when the strain on the gap panel is released, the conductive particles in the conductive layer are able to reestablish contact across cracked portions of the coating. However, as this subcritical damage accumulates over several cycles, the coating is not able to fully recover.

Overall, apparatus and methods of the present disclosure provide a controlled testing environment under deep freeze and high temperature conditions and monitoring of material performance, such as coating degradation and/or corrosion, on a variety of material systems, such as aircraft material systems, such as panels, coated lap joints between two or more panels, wing-to-fuselage assemblies, or combinations thereof. Material systems, apparatus and methods of the present disclosure provide an ability to replicate in-service, real-world failure modes and mechanisms in a controlled exposure environment, such as under deep freeze and high temperature conditions.

Mechanical flexing of a material system in an apparatus of the present disclosure may result in increased corrosion or reduced coating performance of a material system. The compounding effects of mechanical and environmental stresses combine to induce degradation that more accurately replicate coating failures and/or corrosion experienced by a material system, such as an aircraft panel, in a real-world environment. Accordingly, methods and apparatus of the present disclosure more accurately simulate the coating damage and/or corrosion observed with aircraft material systems during real-world use of the aircraft, such as under deep freeze and high temperature conditions. Material systems, methods and apparatus of the present disclosure allow for testing coating impedance and/or corrosion of stand-alone material systems and the interfaces between coating layers, which more accurately represents the degradation experienced by material systems, such as panels, during actual use of the material systems as part of an aircraft. Material systems, methods and apparatus of the present disclosure further provide re-creation of irregular flight-specific strain profiles so that improved predictive as well as forensic investigations of aircraft material systems may be performed.

Material systems, methods and apparatus of the present disclosure provide electrochemical monitoring of a coating during outdoor exposure, accelerated testing in an environmental chamber, and electrochemical monitoring of material systems while in use (e.g, in situ). In situ electrochemical monitoring provides assessment of the integrity of a material system without visual inspection of the material system and does not require stoppage of a flexing of a material system and/or exposing the material system to environmental conditions.

While the foregoing is directed to aspects of the present disclosure, other and further aspects of the present disclosure may be devised without departing from the basic scope thereof. Furthermore, while the foregoing is directed to material systems, such as aircraft material systems, such as panels, coated lap joints between two or more panels, and wing-to-fuselage assemblies, aspects of the present disclosure may be directed to other material systems not associated with an aircraft, such as a multicomponent material system used in aerospace, automotive, marine, energy industry, and the like.

What is claimed is:

1. An apparatus comprising:
    a first enclosure configured to control one or more of humidity, pressure, or temperature;
    a jaw configured to flex a material system;
    a second enclosure disposed within the first enclosure, the second enclosure comprising a plate comprising an insulating material;
    a motor or actuator disposed on a rack and disposed within the second enclosure, wherein the plate is in direct contact with the motor or actuator;
    an inlet tube coupled with the second enclosure at a first end and a first wall of the first enclosure at a second end; and
    an outlet tube coupled with the second enclosure at a first end and the first wall or a second wall of the first enclosure at a second end.

2. The apparatus of claim 1, wherein the first enclosure is configured to control each of humidity, pressure, and temperature.

3. The apparatus of claim 1, wherein the insulating material is a fiberglass.

4. The apparatus of claim 1, wherein the insulating material is high density polyethylene.

5. The apparatus of claim 1, further comprising a second plate disposed between the second enclosure and the jaw, the second plate comprising an insulating material.

6. The apparatus of claim 5, wherein the insulating material of the plate is a polyethylene or fiberglass.

7. The apparatus of claim 6, wherein the insulating material of the plate is high density polyethylene.

8. The apparatus of claim 1, wherein the inlet tube comprises a first gas source and a second gas source.

9. The apparatus of claim 8, wherein the second gas source is coupled with and disposed along a surface of the plate.

10. The apparatus of claim 8, wherein the second enclosure further comprises a recess disposed in a surface of the second enclosure, wherein the second gas source is disposed in the recess.

11. The apparatus of claim 1, further comprising:
a first block and a second block;
a first guide rod coupled at a first end with the first block and coupled at a second end with the second block; and
a second guide rod coupled at a first end with the first block and coupled at a second end with the second block.

12. The apparatus of claim 1, wherein:
the second enclosure further comprises a temperature control device coupled with the motor or actuator.

13. The apparatus of claim 1, wherein the second enclosure further comprises a heater coupled with the motor or actuator.

14. The apparatus of claim 1, wherein the second enclosure further comprises a thermocouple coupled with the motor or actuator.

15. The apparatus of claim 1, wherein:
a first plurality of walls define the first enclosure;
a second plurality of walls define the second enclosure; and
the second plurality of walls is disposed within the first enclosure defined by the first plurality of walls.

16. The apparatus of claim 1, further comprising a spectrometer and an electrode, wherein the electrode is coupled at a first end with the spectrometer and configured to be coupled at a second end with a material system.

17. The apparatus of claim 16, wherein the spectrometer is an electrochemical impedance spectrometer.

18. A method for determining material performance comprising:
exposing a material system to a relative humidity of from 0% to 98% in an apparatus and flexing the material system using a jaw in the apparatus at a first temperature in a first enclosure of the apparatus, the first enclosure comprising a second enclosure disposed within the first enclosure, and a motor or actuator disposed on a rack and disposed within the second enclosure, wherein the second enclosure comprises a plate comprising an insulating material, wherein the plate is in direct contact with the motor or actuator; and
operating the motor or the actuator at a second temperature different from the first temperature during the flexing,
the apparatus further comprising:
an inlet tube coupled with the second enclosure at a first end and a first wall of the first enclosure at a second end; and
an outlet tube coupled with the second enclosure at a first end and the first wall or a second wall of the first enclosure at a second end.

19. The method of claim 18, further comprising providing a gas to the second enclosure.

20. The method of claim 18, wherein the first enclosure has a temperature of from about −70° C. to about −20° C. and the second enclosure has a temperature of from about −10° C. to about 25° C.

21. The method of claim 18, wherein the first enclosure has a temperature of from about 50° C. to about 80° C. and the second enclosure has a temperature of from about −10° C. to about 25° C.

22. An apparatus comprising:
a first plurality of walls defining a first enclosure configured to control one or more of humidity, pressure, or temperature;
a jaw configured to flex a material system;
a second plurality of walls defining a second enclosure disposed within the first enclosure defined by the first plurality of walls, the second enclosure comprising a heater coupled with a motor or actuator disposed within the second enclosure;
an inlet tube coupled with the second enclosure at a first end and the first enclosure at a second end; and
an outlet tube coupled with the second enclosure at a first end and the first enclosure at a second end.

23. The apparatus of claim 22, wherein the heater is configured to control temperature of the motor or actuator.

24. The apparatus of claim 22, further comprising a spectrometer and an electrode, wherein the electrode is coupled at a first end with the spectrometer and configured to be coupled at a second end with a material system.

* * * * *

UNITED STATES PATENT AND TRADEMARK OFFICE
CERTIFICATE OF CORRECTION

PATENT NO. : 11,175,214 B2
APPLICATION NO. : 16/223285
DATED : November 16, 2021
INVENTOR(S) : Kristen Smith Williams et al.

It is certified that error appears in the above-identified patent and that said Letters Patent is hereby corrected as shown below:

In the Specification

In Column 10, Line 53, delete "Armology" and insert -- Armoloy --.

In Column 16, Line 41, delete "nScript" and insert -- nScrypt --.

In Column 16, Line 52, delete "nScript" and insert -- nScrypt --.

In Column 22, Line 61, delete "step)" and insert -- step). --.

Signed and Sealed this
Sixteenth Day of August, 2022

Katherine Kelly Vidal
*Director of the United States Patent and Trademark Office*